(12) United States Patent
Koziarz et al.

(10) Patent No.: US 8,723,884 B2
(45) Date of Patent: May 13, 2014

(54) SCAN CONVERTING A SET OF VECTOR EDGES TO A SET OF PIXEL ALIGNED EDGES

(75) Inventors: Krzysztof Adan Koziarz, Denistone (AU); Edward James Iskenderian, Toongabbie (AU)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/473,172

(22) Filed: May 27, 2009

(65) Prior Publication Data

US 2009/0295828 A1 Dec. 3, 2009

(30) Foreign Application Priority Data

May 28, 2008 (AU) ............................... 2008202364

(51) Int. Cl.
*G09G 5/00* (2006.01)
(52) U.S. Cl.
USPC .......................................................... 345/619
(58) Field of Classification Search
CPC ....................................................... G06T 11/00
See application file for complete search history.

(56) References Cited

U.S. PATENT DOCUMENTS

| | | | |
|---|---|---|---|
| 7,023,439 B2 * | 4/2006 | Martin et al. | 345/428 |
| 7,046,253 B2 | 5/2006 | Long et al. | |
| 2001/0055130 A1 * | 12/2001 | Geurts et al. | 358/530 |
| 2003/0147098 A1 * | 8/2003 | Gnutzmann | 358/2.1 |
| 2005/0122337 A1 | 6/2005 | Chen | |
| 2006/0098230 A1 * | 5/2006 | Oki | 358/3.06 |
| 2007/0206012 A1 * | 9/2007 | Combes et al. | 345/441 |

FOREIGN PATENT DOCUMENTS

| | | |
|---|---|---|
| AU | 2006246474 | 6/2008 |
| EP | 1612737 A2 | 1/2006 |

OTHER PUBLICATIONS

Examiner's Report dated Apr. 16, 2010 in corresponding Australian Application No. 2008202364.
Notice of Acceptance dated Apr. 7, 2011 in Australian Application No. 2008202364.

* cited by examiner

*Primary Examiner* — Maurice L McDowell, Jr
*Assistant Examiner* — Kyle Zhai
(74) *Attorney, Agent, or Firm* — Fitzpatrick, Cella, Harper & Scinto

(57) ABSTRACT

Disclosed is a process (1500) for converting an image, comprising a set of vector input edges, to a set of corresponding pixel-aligned non-overlapping output edges. The process (1500) traverses (1502) a first scanline to detect the intersection of a first active vector input edge with the first scanline. The process then identifies (1503) a fill compositing sequence referenced by the detected first input edge, and then creates (1504) a first pixel aligned output edge associated with the first input edge. The process then traverses (1505) a second scanline to detect the intersection of a second active vector input edge with the second scanline, after it determines (1506) whether the detected second input edge can be associated with the first output edge on the first scanline. If so then the process extends (1507) the first output edge from the first scanline to a pixel boundary in the vicinity of the intersection of the second input edge with the second scanline.

15 Claims, 21 Drawing Sheets

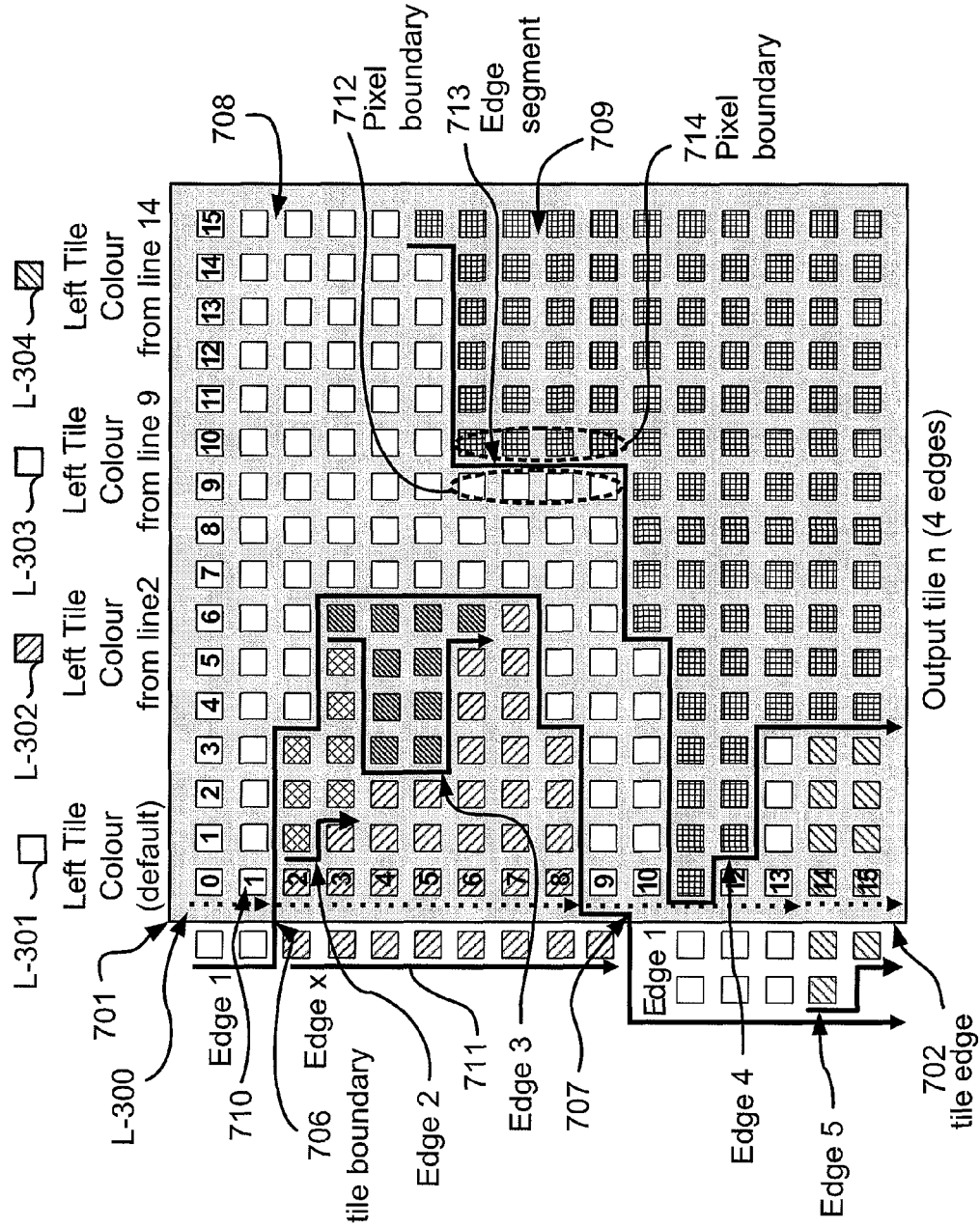

SCAN CONVERTING A SET OF VECTOR EDGES TO A SET OF PIXEL ALIGNED EDGES

FIELD OF THE INVENTION

This invention relates generally to image processing, and more particularly but not exclusively, relates to processing a vector image into a corresponding raster image.

BACKGROUND

There are several known computer applications for transforming input graphics from vector representations to raster representations. For example, such a transformation is needed to display computer graphics on a display device, such as a computer monitor, or to display computer graphics on a page using a printing device, such as a laser beam printer.

A computer application, such as a word processor, can provide input graphics to an output device for display in the form of a high level description of the page or scene to be rendered, as opposed to a raster image of the graphics to be displayed or printed. This high level page description typically comprises high level graphics such as path data, text, and fill information (including flat colours, linear gradients and images). The high level description is provided to device driver software of the device either in the form of a Page Description Language (PDL) file, such as Adobe PostScript™ or Hewlett-Packard PCL™, or in the form of function calls to a graphical interface, such as the Graphical Device Interface™ (GDI) in the Microsoft Windows™ operating system, or X-11 in the Unix™ operating system. The page is typically rendered by an object-based graphics system, also known as a Raster Image Processor (RIP).

As input graphics vary in complexity, it cannot however generally be guaranteed that the output device can render any given collection of input graphics in real time. Hence, the input graphics are typically transformed into a simpler form before being sent to the output device. In typical RIPs the simpler form is an entire page of pixels in memory or on a hard disk drive that is shipped to the output device.

This approach has a number of problems. Firstly, the page is rendered to pixels at the output device resolution. This requires a large amount of memory to store the pixel data. Even after applying a compression algorithm such as Joint Photographic Experts Group (JPEG), the amount of data can still be significant. This approach is also sensitive to an increase in either output display resolution and/or output image dimensions. Thus for example doubling the output image resolution increases the amount of memory required to store pixel data by a factor of four.

Another problem with this approach is that in order to achieve a significant reduction in the memory requirements of the output display device, a lossy image compression algorithm such as JPEG, is typically required. This results in a loss in the quality of the rendered output. Such quality degradation is particularly evident when the compression algorithm is applied to sharp edges commonly found in text and graphic regions of the page, resulting in undesirable visual artifacts.

SUMMARY

It is an object of the present invention to substantially overcome, or at least ameliorate, one or more disadvantages of existing arrangements.

Disclosed are arrangements, referred to as Scan-based Edge Conversion (SBEC) arrangements, which seek to address the above problems by scan converting vector input edges, which are derived from associated overlapping input graphic objects in the high level description, into non-overlapping pixel aligned output edges.

According to one aspect of the invention, there is provided a method of scan converting a vector input edge into a corresponding pixel-aligned non-overlapping output edge on a rendering device, said method comprising, for a current scanline, the steps of:

(a) traversing the current scanline to detect a vector input edge on the current scanline, the vector input edge referencing a fill compositing sequence, the vector input edge being associated with a first output edge on a previous scanline, the first output edge referencing said fill compositing sequence;

(b) determining whether a second output edge precedes the vector input edge on the current scanline, said second output edge preceding said first output edge on the previous scanline; and (c) extending the first output edge to a pixel-aligned pixel position where the vector input edge crosses the current scanline if the second output edge precedes the vector input edge.

Other aspects of the invention are also disclosed.

BRIEF DESCRIPTION OF THE DRAWINGS

One or more embodiments of the invention will now be described with reference to the drawings, in which.

DETAILED DESCRIPTION INCLUDING BEST MODE

Figure 1:
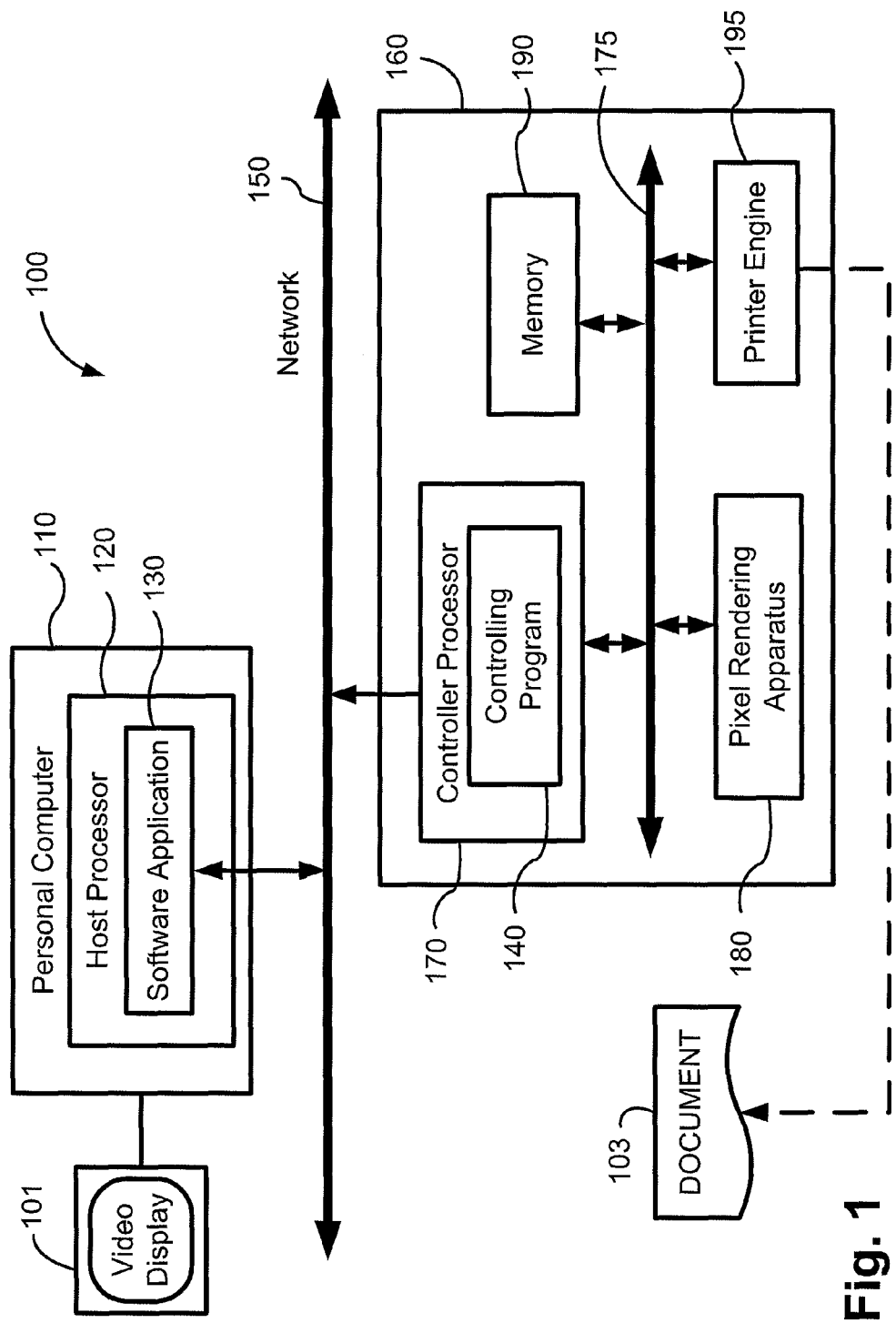
FIG. 1 shows a schematic block diagram of a pixel rendering system for rendering computer graphic object images using the SBEC approach.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of arrangements which may form public knowledge through their use. Such discussions should not be interpreted as a representation by the present inventor(s) or patent applicant that such arrangements in any way form part of the common general knowledge in the art.

FIG. 1 shows a schematic block diagram of a pixel rendering system 100 for rendering computer graphic object images. The system 100 may be used either according to known rendering methods, or according to the SBEC approach. The pixel rendering system 100 comprises a personal computer 110 connected to a printer system 160 through a network 150. The network 150 may be interconnected to multiple machines including personal computers, or may be a simple connection between a single personal computer 110 and the printer system 160.

The personal computer 110 includes a host processor 120 for executing a software application 130, such as a word processor or graphical software application.

The printer system 160 includes a controller processor 170 for executing a controlling program 140, a pixel rendering apparatus 180, a memory 190, and a printer engine 195 coupled via a bus 175. The pixel rendering apparatus 180 is typically implemented in the form of an Application Specific Integrated Circuit (ASIC) coupled via the bus 175 to the controller processor 170, and the printer engine 195. However, the pixel rendering apparatus 180 may also be implemented in software executed in the controller processor 170, or by a mixture of hardware and software. FIG. 1 shows a particular distribution of functional modules, however other distributions can be used.

The SBEC method may be implemented using the pixel rendering system 100, such as that shown in FIG. 1 wherein the SBEC processes of FIGS. 8, 9, 10A-10B, 11A-11C, 12, and 13A-13D may be implemented as software, such as one or more SBEC application programs 140 executable within the system 100. In particular, the SBEC method steps are performed by instructions in the SBEC software 140 that are carried out within the system 100.

The instructions may be formed as one or more code modules, each for performing one or more particular tasks. The software may also be divided into two separate parts, in which a first part and the corresponding code modules performs the SBEC methods and a second part and the corresponding code modules manage a user interface between the first part and the user. The software may be stored in a computer readable medium, including the storage devices described below, for example. The software is loaded into the system 100 from the computer readable medium, and then executed by the system 100. A computer readable medium having such software or computer program recorded on it is a computer program product. The use of the computer program product in the system 100 preferably effects an advantageous SBEC apparatus.

As seen in FIG. 1, the system 100 is formed by the personal computer 110 (including the host processor 120 for executing the software application 130) connected to the printer system 160 (including the controller processor 170, the pixel rendering apparatus 180, the memory 190, and the printer engine 195) through the network 150. The network 150 may be a Wide-Area Network (WAN), such as the Internet, or a private WAN or Local Area Network (LAN).

Typically, the SBEC application program 140 discussed above is resident on a hard disk drive (not shown) and read and controlled in execution by the processor 170. Intermediate storage of such programs and any data fetched from the network 150 may be accomplished using the semiconductor memory 190, possibly in concert with the hard disk drive.

In some instances, the SBEC application programs 140 may be supplied to the user encoded on one or more CD-ROMs and read via the corresponding drive (not shown), or alternatively may be read by the user from the network 150. Still further, the SBEC software 140 can also be loaded into the system 100 from other computer readable media.

The term "computer readable media" refers to any storage or transmission medium that participates in providing instructions and/or data to the system 100 for execution and/or processing. Examples of non-transitory storage media include floppy disks, magnetic tape, CD-ROM, a hard disk drive, a ROM or integrated circuit, a magneto-optical disk, or a computer readable card such as a PCMCIA card and the like, whether or not such devices are internal or external of the PC 110 or the printer system 160. Examples of computer readable transmission media that may also participate in the provision of instructions and/or data include radio or infra-red transmission channels as well as a network connection to another computer or networked device (not shown), and the Internet or Intranets including e-mail transmissions and information recorded on Websites and the like.

A second part of the application programs and the corresponding code modules mentioned above may be executed to implement one or more graphical user interfaces (GUIs) to be rendered or otherwise represented upon a display (not shown). Through manipulation of user interface devices such as a keyboard and/or mouse (not shown), a user of the system 100 and the SBEC application 140 may manipulate the interface to provide controlling commands and/or input to the applications associated with the GUI(s).

The SBEC method may alternatively be implemented in dedicated hardware such as one or more gate arrays and/or integrated circuits performing the SBEC functions or sub functions, or using other mixed hardware/software arrangements having different distributions of functional modules. Such arrangements may also include graphic processors, digital signal processors, or one or more microprocessors and associated memories (not shown). If gate arrays are used, the process flow charts in FIGS. 8, 9, 10A-10B, 11A-11C, 12, and 13A-13D are converted to Hardware Description Language (HDL) form. This HDL description is converted to a device level netlist which is used by a Place and Route (P&L) tool to produce a file which is downloaded to the gate array(s) to program it/them with the design specified in the HDL description.

In the pixel rendering system 100, the software application 130 typically creates page-based documents where each page contains objects (such as 510 in FIG. 3) such as text, lines, fill regions, and image data. The software application 130 sends a high level description of a page (the high level description may for example use a Page Description Language in the form of a PDL file) containing graphic objects 430 (see FIG. 2) to the controlling program 140 (which is running on the controller processor 170 of the printer system 160) via the network 150.

The controlling program 140, which receives the description 430 of the page in question (eg 500 in FIG. 3) from the software application 130, will be described in detail with reference to FIG. 2. The role of the controlling program 140 is to generate a page representation 450 (see FIG. 2) that can be rendered to pixels by the pixel rendering apparatus 180. The SBEC controlling program 140 comprises an objects decomposition driver 410 and a primitives processor 420, both being implemented by the controller processor 170 under the control of the SBEC software 140.

The method employed by the controlling program 140 is to first decompose the graphic objects 430 derived from the high level description of the page which was passed from the software application 130 into vector input edges, levels and fills, as depicted by 440, using the objects decomposition driver 410. Vector input edges describe the geometric shape of a graphic object. Vector input edges are monotonic with respect to the y direction of the page and are composed of one or more straight line segments. Levels describe whether an object should be painted above or behind other objects, and how colour and opacity from an object should be combined with colour and opacity from other overlapping objects. Fills describe the colour, the opacity, the colour blend and/or the image to be painted within the shape of the object. A fill may, for example, be a flat fill representing a single colour, a blend representing a linearly varying colour, a bitmap image or a tiled (i.e. repeated) image, or may take another form. As noted above, these vector input edges, levels and fills are called the first set of primitives 440.

Within the primitives processor 420, the first set of primitives 440 is further processed to generate a second set of primitives 450, these primitives comprising a fillmap, and a table of fill compositing sequences.

A fillmap is a region based representation of a page. The fillmap maps a region within the page to a fill compositing sequence which will be evaluated to generate the colour of each pixel within that region. Each region consists of a contiguous group of pixels referencing the same fill compositing sequence in the table of fill compositing sequences. The table of fill compositing sequences contains all the fill compositing sequences referenced by the fillmap. Multiple regions within a fillmap can map to the same fill compositing sequence. Regions within the fillmap do not overlap and hence each pixel in the rendered page can only belong to a single region. The boundary of each region within the fillmap is defined by a set of pixel-aligned output edges. The pixel aligned output edges have the following attributes:

they are monotonically increasing in the y-direction of the page;
  they do not intersect (overlap) each other (ie they are non-intersecting);
  they are pixel aligned, meaning that each output edge consists of a sequence of segments, each of which follows a boundary between two contiguous pixels (thus for example the output edge segment 713 in FIG. 7 runs between two contiguous pixel boundaries 712 and 714);
  they contain a reference field referring to the index of the fill compositing sequence, within the table of fill compositing sequences, required to be composited to generate the value of each pixel in the region which the output edge defines; and
  they each activate a single region.

On any given scanline, starting at the pixel aligned output edge which activates a region and progressing in the direction of increasing x, the region remains active until a pixel aligned output edge which activates a further region is encountered. When such an edge is encountered, the active region is deactivated, and the region corresponding to that edge is activated.

A fill compositing sequence is a sequence of Z-ordered entries. Each entry within the fill compositing sequence references level information which contains attributes such as a fill and a raster operation. A fill is used by the pixel rendering apparatus 180 to calculate the output pixel colour at any given location in the page. A raster operation specifies how to mix the colour data produced by the fill with colour data produced by other fill compositing sequence entries. The fill compositing sequence active within each region of pixels defined by the fillmap is stored in the table of fill compositing sequences.

The program 140 executing on the controller processor 170 is also responsible for providing memory 190 for the pixel rendering apparatus 180, initialising the pixel rendering apparatus 180, and instructing the pixel rendering apparatus 180 to start rendering the job.

The pixel rendering apparatus 180 then uses the second set of primitives 450 to render the page 500 to pixels. The output of the pixel rendering apparatus 180 is colour pixel data, which may be used by the printer engine 195 which can print the pixels on a document 103 produced. Alternately, the colour pixel data from the rendering apparatus 180 can be communicated to the personal computer 110 for presentation on a display 101 communicating with the personal computer 110.

The graphic objects 430 and the first set of primitives 440 will now be described with reference to FIG. 3.

Figure 3:
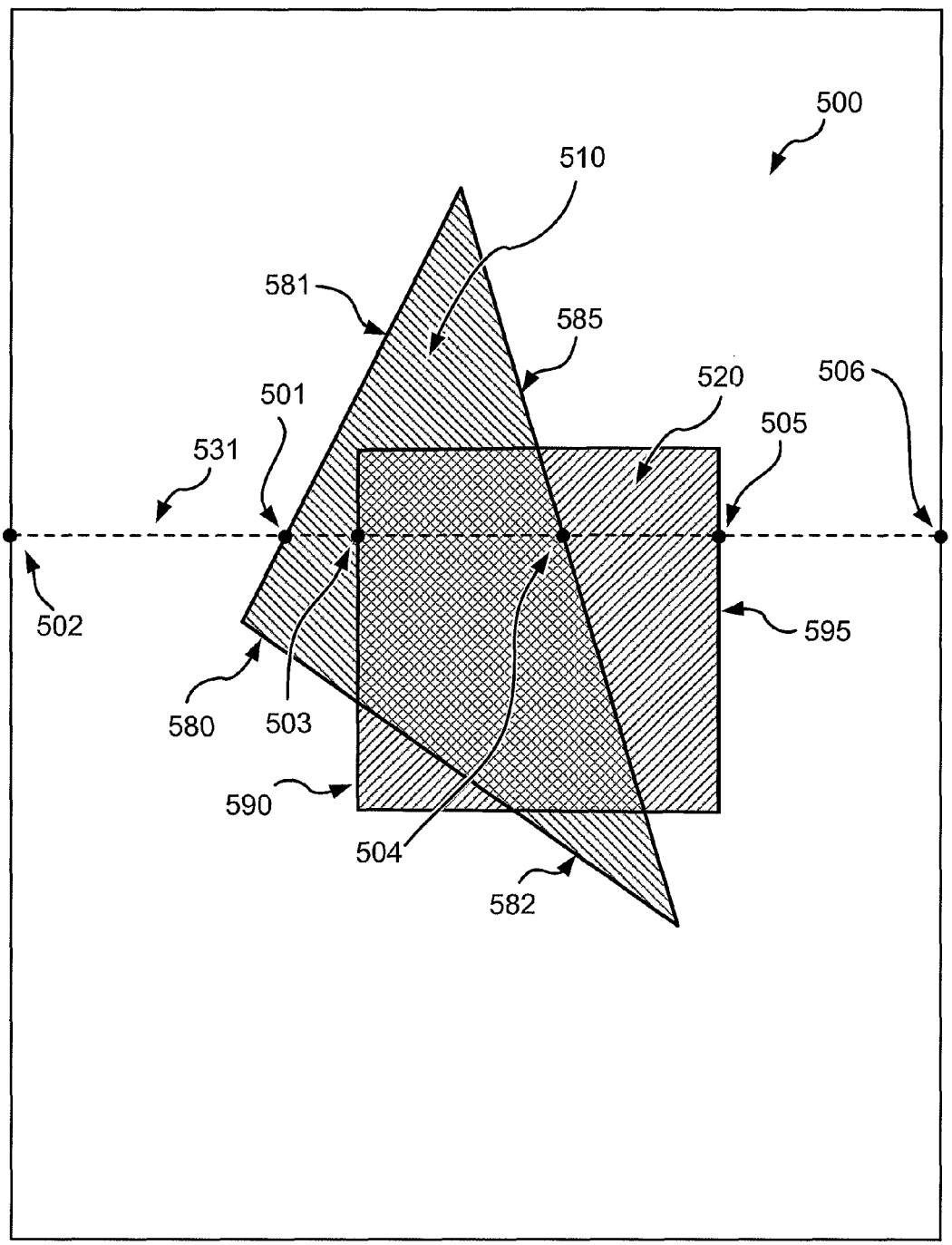
FIG. 3 shows two overlapping objects which are used to illustrate how the pixel rendering system of FIG. 1 operates.

FIG. 3 depicts two graphic objects 510 and 520 on the page 500. The graphic objects 430 are a triangle 510 with a light grey flat fill, and a square 520 with a dark grey flat fill. The triangle 510 is above the square 520 and therefore has a higher priority than the square 520. The triangle 510 also partially overlaps the square 520. The triangle 510 is partially transparent while the square 520 is fully opaque. The background of the page 500 is white. The graphic objects 510 and 520 are derived from a high level description of the page which may have been in the form of a page language description such as Adobe PostScript™.

Figure 2:
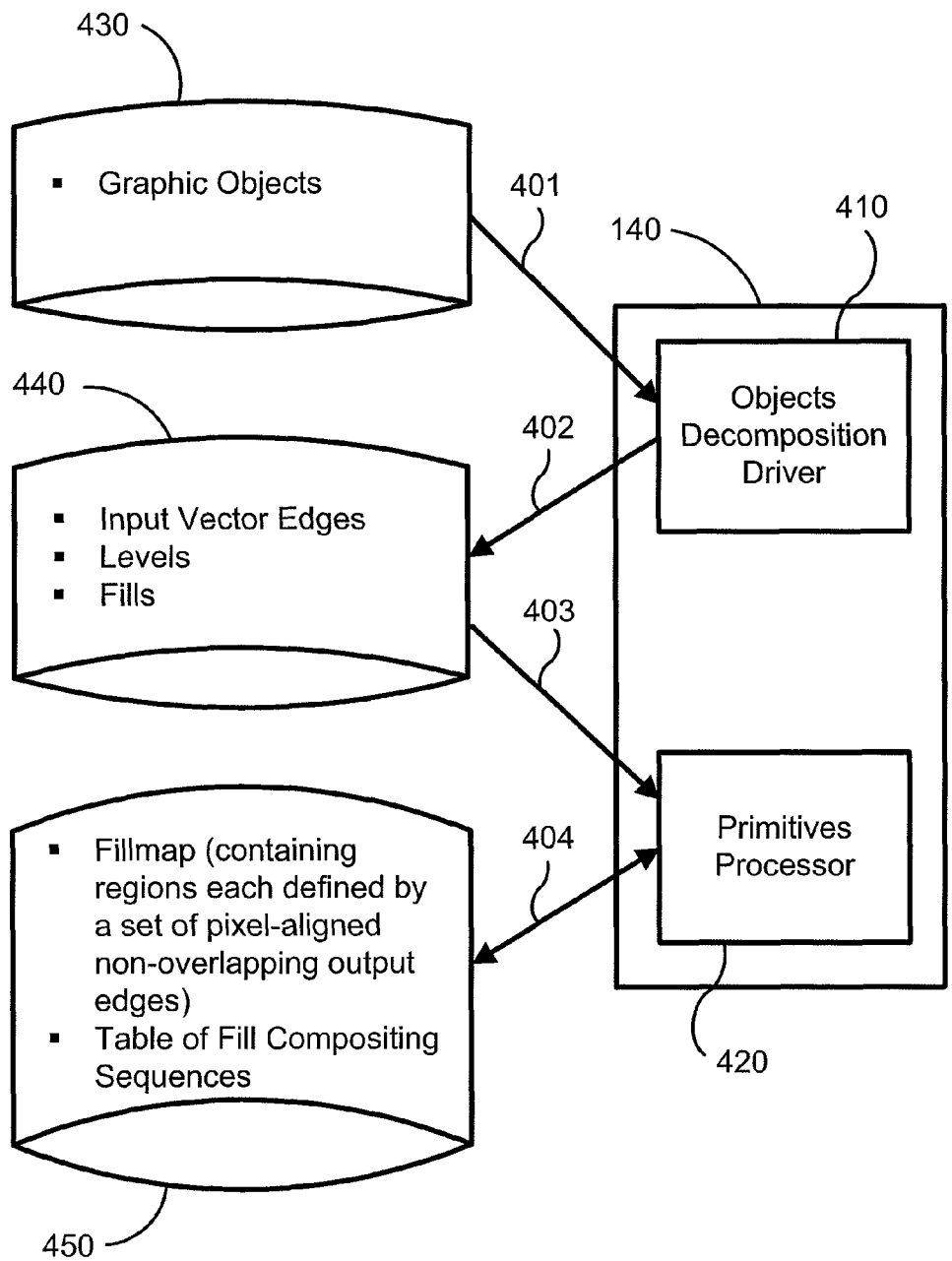
FIG. 2 shows a data flow diagram of a controlling program in the pixel rendering system shown in FIG. 1.

In the pixel rendering system 100, the controlling program 140 running on the controller processor 170 constructs, as depicted by 401, 410 and 402 in FIG. 2, the first set of primitives, depicted by 440, wherein the triangle 510 is described by its corresponding level and two vector input edges 580 and 585. The first vector input edge 580 is downwards heading, and consists of two segments 581 and 582. The vector input second edge 585 is upwards heading and consists of a single segment. The square 520 is also described by its corresponding level and two vector input edges 590 and 595. The first vector input edge 590 is downwards heading, and consists of one segment. The second vector input edge 595 is upwards heading and also consists of one segment only.

To understand how the pixel rendering system 100 generates fill compositing sequences during the rendering process, given a collection of objects on the page 500, consider a scanline 531 in FIG. 3. When rendering by traversing, using the controller 170 running the program 140, this scanline 531 from left to right, commencing at a point 502 (the location of the point 502 being delineated by a dot) at the left hand edge of the page 500, no levels are active until the segment 581 of the edge 580 is encountered at a point 501 (i.e. until the rendering system 100 detects the presence of the segment 581 of the edge 580 at the point 501 on the scanline 531). Hence, the list of active levels, stored in memory (not shown) on-board the processor 170 and/or in the memory 190, which had no members (i.e. levels) at the beginning of the scanline, remains empty for the run of pixels between the point 502 at the left hand edge of the page 500 and the point 501 at which the segment 581 of edge 580 is encountered. The list of active levels is an ordered list of all the levels that are active for the current run of pixels encountered while traversing the scan-line 531 from left to right, using the controller 170 running the program 140. The list of active levels is sorted by priority. Said current run of pixels has as its left hand boundary the point where the vector input edge being processed crosses the current scanline 531, i.e. the point 502. The right hand boundary of the current run of pixels is the point where the next vector input edge is to be processed, i.e. the point 501. A pixel placement rule, stored in memory (not shown) on-board the processor 170 and/or in the memory 190, is used to determine the integer pixel location, along a given scanline, at which a vector input edge crosses that scanline. Pixel placement rules will be explained below in more detail below with reference to FIG. 14. Since the list of active levels contains no levels, the fill compositing sequence contains no entries. This is denoted as the background fill compositing sequence and is active in the run of pixels between the point 502 and the point 501.

At the point 501, the level associated with the object 510 is activated, using the controller 170 running the program 140 and added to the list of active levels. Between the points 501 and 503 the list of active levels contains one member only, i.e. the level associated with 510. Accordingly, the fill compositing sequence consisting of a single entry containing the fill and raster operation derived from level 510, is active in the run of pixels between the point 501 and point 503.

At the point 503 the level with object 520 is activated, using the controller 170 running the program 140 and added to the list of active levels. Between point 503 and the point 504 the list of active levels, stored in memory (not shown) on-board the processor 170 and/or in the memory 190, contains both the level associated with object 520 and the level associated with the object 510. The fill compositing sequence for this run of pixels contains two entries. The topmost entry contains fill and raster operations derived from level associated with object 510. The bottom entry contains fill and raster operation derived from level associated with object 520.

At the point 504 the level associated with object 510 is deactivated and removed from the list of active levels. Between the points 504 and 505 the active level list contains the level associated with object 520 only. Accordingly the fill compositing sequence containing a single entry containing fill and raster operation derived from level associated with object 520 is active in this run of pixels.

Finally, at the point 505 the level associated with object 520 is deactivated and removed from the list of active levels. Between the point 505 and the point 506 the list of active levels contains no levels. Accordingly the background fill compositing sequence is active for this run of pixels.

Figure 14:
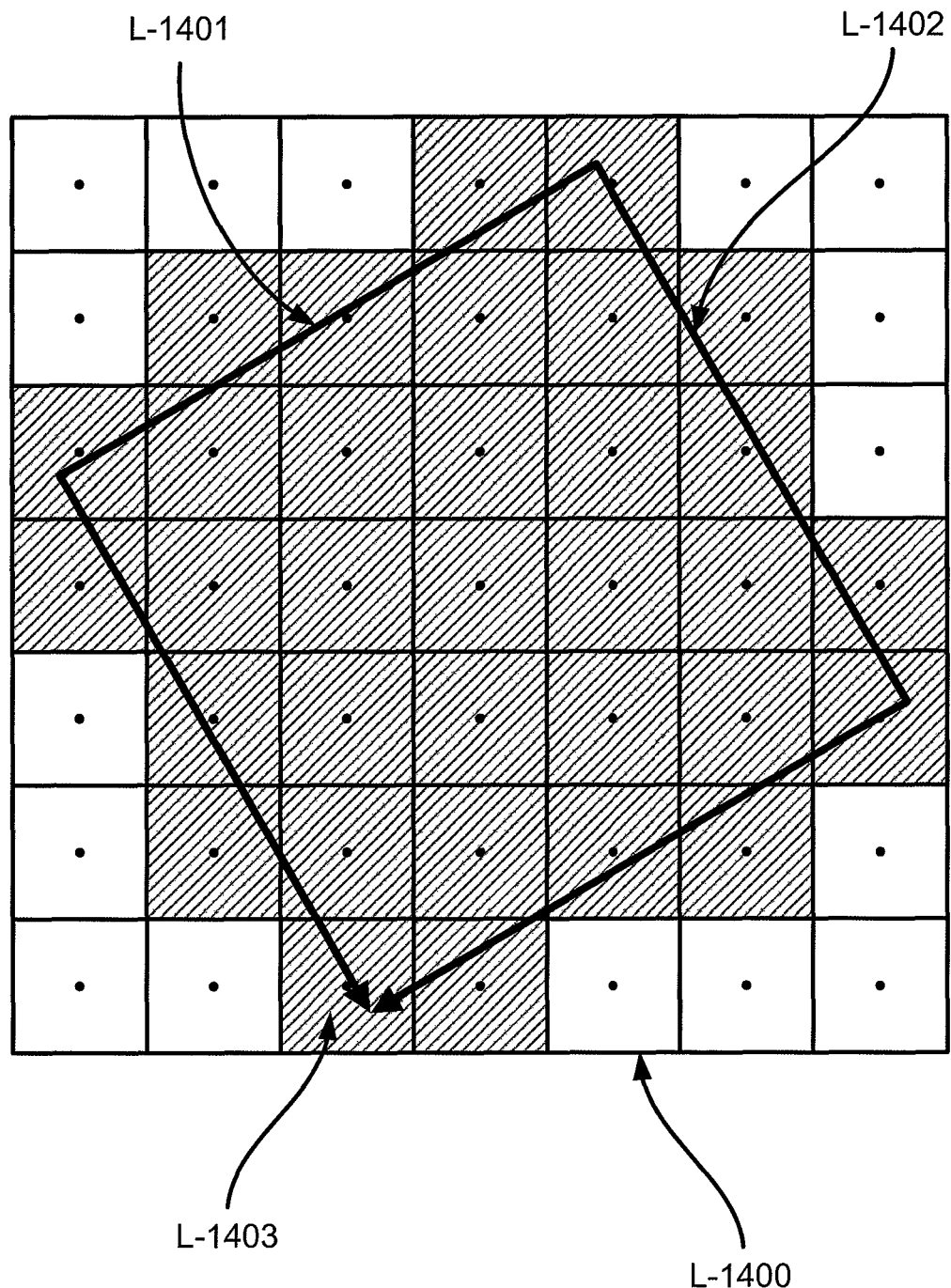
FIG. 14 shows a set of edges in regard to which rendering of the outline of a graphic object onto a pixel grid is described using the SBEC approach.

FIG. 14 shows a set of edges L-1401 & L-1402 describing the outline of a graphic object to be rendered onto a pixel grid L-1400. When the graphic object is scan converted using the PostScript pixel placement rule, the pixels lying within the hatched region L-1403 are filled with the fill associated with the object. The PostScript pixel placement rule specifies that every pixel that is touched by an edge of the object is considered to be part of the object, and hence should be filled. Other pixel placement rules exist, such as the GDI and PCL pixel placement rules. Each set of pixel placement rules can differ from the others in how they determine which pixels a fill or a stroke should be applied to, given a set of edges which describe the outline of a graphic object.

Referring again to FIG. 2, after the primitives processor 420 determines the fill compositing sequence which is activated by each vector input edge on a given scanline, the controlling program 140 proceeds to generate, as depicted by arrows 403 and 404 and process 420 in FIG. 2, a compact output representation 450 comprising a 'fillmap' and a table of fill compositing sequences. This compact output representation is referred to as the second set of primitives 450.

In one arrangement, the scan conversion of vector input edges to pixel aligned output edges involves converting at least part of the input graphics objects 440 (eg 510, 520 in FIG. 3) into runs of pixels (where the output for each pixel in a run is derived from the same fill compositing sequence) and then combining the runs to form the pixel aligned output edges. At each scanline, runs from the previous and current scanline are analysed, and runs which reference the same fill compositing sequence, and which overlap, are combined to form pixel aligned output edges, which together with their referenced fill compositing sequences, constitute the compact output representation. This method of generating pixel aligned output edges is suboptimal, both in terms of processing time and working memory. Firstly, the intermediate run data is required to be stored in memory, which increases the memory requirements of the device implementing said method. Secondly, the process of breaking the original input graphics into a set of spans, and then recombining the spans into pixel aligned output edges, requires significant computational resources.

In another arrangement, in order to improve the efficiency of encoding the resulting pixel aligned output edges, the fillmap is divided into rectangular tiles. Each tile within the fillmap is self contained, and can be rendered independently of data contained within other tiles. This "independence" is achieved by incorporating information from at least some neighbouring tiles into each tile. In order to achieve such independence, extra edges at the tile vertical boundaries are also added. These edges do not correspond to any edges in the vectorized input 440, but are the result of the output edges being split at tile boundaries.

By associating the compositing stack to the edges in the SBEC arrangements, the method bypasses the need to convert input vector edges into runs of pixels. If the compositing stack of the input edge is the same as the compositing stack of the output edge in a preceding scanline, the output edge can be extended.

Computer processing resources are significantly reduced with the SBEC arrangements as the input vector edges are not converted to runs of pixels. Firstly, the SBEC arrangements do away with the time and memory requirements for reading and writing the pixel run information. Secondly, there is no need to search the list of output edges in the preceding scanline for a corresponding output edge as the compositing stack of the input scanline can be matched to the compositing stack of the nearest output edge in one SBEC arrangement. Thirdly, conversion of the input vector edges to runs to pixels requires the scanlines to be traversed twice, once for the generation of the pixel runs, and again for the generation of output edges. By using the SBEC arrangements, only one traversal of each scanline is needed, and thus, the processing time is cut by at least half that of previous methods.

The disclosed SBEC approach generates pixel aligned output edges (being edges that are rendered to produce output pixels) made up of a start point and zero or more x-offsets. These pixel aligned output edges may fall into one or more tiles. Each said tile contains sufficient data such that it can be rendered to pixels independently of all other tiles.

The SBEC approach scan converts a set of overlapping vector input edges, each vector input edge referencing a level which contains fill, into a corresponding set of non-overlapping pixel aligned output edges. Each pixel aligned output edge is aligned to a pixel boundary (a "pixel boundary" being one or more pixels near to an output edge segment), and each pixel aligned output edge references a single fill compositing sequence. According to one example, the SBEC approach can be performed as follows:

- for each vector input edge that is active on the current scanline (the term "active" indicating that the vector input edge contributes to the output of subsequent pixels on the current scanline), determine the point of intersection of the vector input edge and the current scanline. This point of intersection is rounded to a pixel boundary location in the vicinity of the intersection, making use of the pixel placement rule associated with the graphic object from which the vector input edge is derived, to form the X coordinate of said vector input edge on the current scanline;
- for each vector input edge on the current scanline, which forms the left boundary of a run of one or more pixels, determine (ie identify) the fill compositing sequence activated by that edge;
- establish the correspondence of the pixel aligned output edges from the preceding scanline to each vector input edge on the current scanline;
- if the fill compositing sequence activated by an vector input edge on the current scanline is the same as the fill compositing sequence activated by that vector input edge on the previous scanline, then extend the pixel aligned output edge already corresponding with the vector input edge from the previous scanline to the X coordinate of the vector input edge on the current scanline
- if it is impossible to extend the pixel aligned output edge because of certain restrictions, for example if the pixel aligned output edge overlaps or crosses with other pixel aligned output edges, then terminate the pixel aligned output edge; and
- for each vector input edge that does not have a corresponding pixel aligned output edge, create a new corresponding pixel aligned output edge and associate it with the vector input edge.

As noted, SBEC pixel aligned output edges are typically made up of segments falling into one or more tiles. The pixel aligned output edges are, in one example, encoded (i.e. recorded) as follows:

- A Start point;
- The number of offsets;
- An offset table; and
- A fill compositing sequence id.

except for the pixel aligned output edges that cross tile vertical boundaries.

The colour of the starting pixel in the upper left corner of each tile is referred to and stored as a "default left colour". Note that the terms "colour" and "fill compositing sequence" will be used interchangeably in this description apart from instances where the context indicates otherwise. Each edge that crosses the vertical tile boundary from left to right, or from right to left, constitutes an event encoded as a "left tile fill compositing sequence change".

With the above-noted type of encoding, it is possible to render the data stored in each tile independently of the data associated with other tiles, and there is no need to encode the output edges along the tile boundaries.

Figure 4:
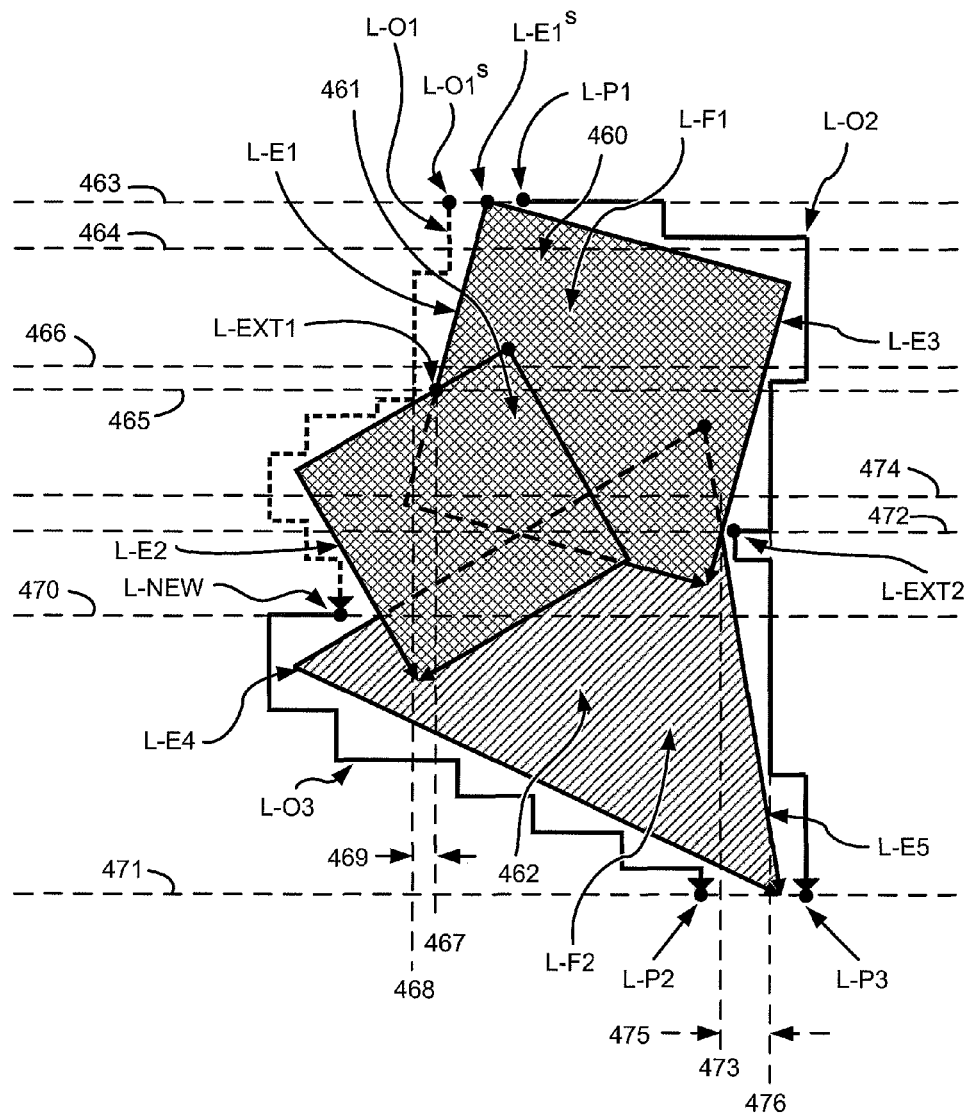
FIG. 4 depicts graphic objects with vector edges that are scan converted to output edges using one example of the SBEC method.

FIG. 4 depicts graphic objects with vector input edges whose conversion from the vector input edges to pixel aligned output edges using the SBEC approach is now described. The example input graphic objects in FIG. 4 consist of 3 opaque, overlapping input graphic objects 460, 461 and 462, stored in memory (not shown) on-board the processor 170 and/or in the memory 190. The fill compositing sequences activated by each vector input edge, for each scanline on which the edge is active, has been determined. Input vector edges L-E1 and L-E2 activate, using the controller 170 running the program 140, a fill compositing sequence which contains a single entry that references a hatched fill L-F1 and uses the raster operation known as COPYPEN, for all scanlines on which the vector input edges L-E1 and L-E2 are active. A vector input edge L-E4 activates a second fill compositing sequence which contains a single entry that references the striped fill L-F2 and also uses the COPYPEN raster operation for the scanlines between the point L-NEW at which it is determined, during the scan conversion process along a scan line 470, that the edge L-E4 has crossed the vector input edge L-E2, and a point L-P2 at which the edge L-E4 terminates. A vector input edge L-E3 activates the background fill compositing sequence for the scanlines between a point L-P1 at which the edge L-E3 is activated, and a point L-EXT2 at which it is determined, while traversing a scanline 472, that the edge L-E3 has crossed a vector input edge L-E5. The vector input edge L-E5 activates the background fill compositing sequence for the scanlines between the point L-EXT2 at which it is determined that the edge L-E5 has crossed the vector input edge L-E3, and a point L-P3 at which the edge L-E5 terminates. The aim of the SBEC scan conversion algorithm is to produce pixel aligned output edges which correspond to the above mentioned vector input edges. Each pixel aligned output edge defines part of a left boundary of a region of pixels or a single region of pixels. Each pixel within a single region will derive its colour from the evaluating the fill compositing sequence that is referenced by the region.

While there are three input graphic objects 460, 461 and 462 in FIG. 4, the SBEC scan conversion algorithm produces two regions. A first region references the fill compositing sequence which contains a single entry that references the hatched fill L-F1 and uses the COPYPEN raster operation, and a second region references the fill compositing sequence which contains a single entry that references the striped fill L-F2 and uses the COPYPEN raster operation. In addition to the regions resulting from the three input graphic objects 460, 461 and 462, the SBEC scan conversion algorithm produces a third region referencing the background compositing sequence. Pixel aligned output edges describing the pixel boundaries of the aforementioned regions are created according to the pixel placement rules described with reference to FIG. 14.

A pixel aligned output edge L-O1 in FIG. 4 is created at a point L-O1$^s$, when the input edge L-E1 is first encountered at a point L-E1$^s$ (ie when the SBEC arrangement detects the presence of the input edge L-E1) during the SBEC scan-conversion process traversing along a scanline 463. The pixel aligned output edge L-O1 is then associated with the vector input edge L-E1. Both edges activate the fill compositing sequence which contains a single entry that references the hatched fill L-F1 and uses the COPYPEN raster operation. More particularly, FIG. 4 shows that the input edge L-E1 activates the aforementioned fill compositing sequence referencing L-F1, and by virtue of the association of the created output edge L-O1 with the input edge L-E1, this fill compositing sequence is ascribed to the output edge L-O1. For each successive scanline such as 464, the pixel aligned output edge L-O1 is extended, vertically in the example shown in FIG. 4, alongside the vector input edge L-E1, until it is determined, at a scanline 465, that the vector input edge L-E1 has crossed the vector input edge L-E2 at a point L-EXT1. Past this point L-EXT1, the vector input edge L-E1 becomes invisible, and does not contribute to the output. Therefore the pixel aligned output edge L-O1 loses its association with the vector input edge L-E1 at the point L-EXT1. However, the vector input edge L-E2 which is in the immediate vicinity of the pixel aligned output edge L-O1 (ie the X coordinate 467 of the vector input edge L-E2 on the current scanline 465 is within a predetermined maximum distance 469 from the position, ie the X coordinate 468, of the pixel aligned output edge L-O1 on the previous scanline 466) now starts activating the fill compositing sequence which contains a single entry that references the hatched fill L-F1 and uses the COPYPEN raster operation, which is the same compositing sequence referenced by L-O1. Accordingly the pixel aligned output edge L-O1 can now be associated with the vector input edge L-E2. As a result of this change of association, the pixel aligned output edge L-O1 can be extended further alongside the vector input edge L-E2, until the vector input edge L-E2 terminates.

The pixel aligned output edge L-O2 in FIG. 4 is created when the vector input edge L-E3 is first encountered at the point L-E1$^s$ during the SBEC scan-conversion process along the scanline 463. The pixel aligned output edge L-O2 is associated with the vector input edge L-E3. Both edges activate the background fill compositing sequence. For each successive scanline, the pixel aligned output edge L-O2 is extended alongside the vector input edge L-E3, until it is determined, while traversing the scanline 472, that the vector input edge L-E3 crosses the vector input edge L-E5 at the point L-EXT2. Past this point, the vector input edge L-E3 starts activating a fill compositing sequence which differs from the background fill compositing sequence. Therefore, the pixel aligned output edge L-O2 loses its association with the vector input edge L-E3 at the point L_EXT2.

However, a vector input edge L-E5 becomes visible and activates the background fill compositing sequence which happens to be the same compositing sequence activated by the pixel aligned output edge L-O2. As the vector input edge L-E5 is in the immediate vicinity of the pixel aligned output edge L-O2 (ie the X coordinate 473 of the vector input edge L-E5 on the current scanline 472 is within a predetermined maximum distance 475 from the position, ie the X coordinate 476, of the pixel aligned output edge L-O2 on a previous scanline 474), the pixel aligned output edge L-O2 can now be associated with the vector input edge L-E5. Due to this change of association, the pixel aligned output edge L-O2 can be extended further alongside the vector input edge L-E5, until the vector input edge L-E5 terminates.

At the point L-NEW, a vector input edge L-E4 activating the fill compositing sequence which contains a single entry that references the hatched fill L-F2 and uses the COPYPEN raster operation, becomes visible. Unlike the case of the edge L-E5 becoming visible at the point L-EXT2, there is no active output edge in the immediate vicinity of the vector input edge L-E4 that activates the same fill compositing sequence which the vector input edge L-E4 activates, namely the compositing sequence which contains a single entry that references the hatched fill L-F2 and uses the COPYPEN raster operation. Therefore no change of association of any output edge to the edge L-E4 can occur. As a result, a new pixel aligned output edge L-O3 is created, and is associated with the vector input edge L-E4. The pixel aligned output edge L-O3 is subsequently extended alongside the vector input edge L-E4 until the input edge L-E4 terminates.

Figure 5:
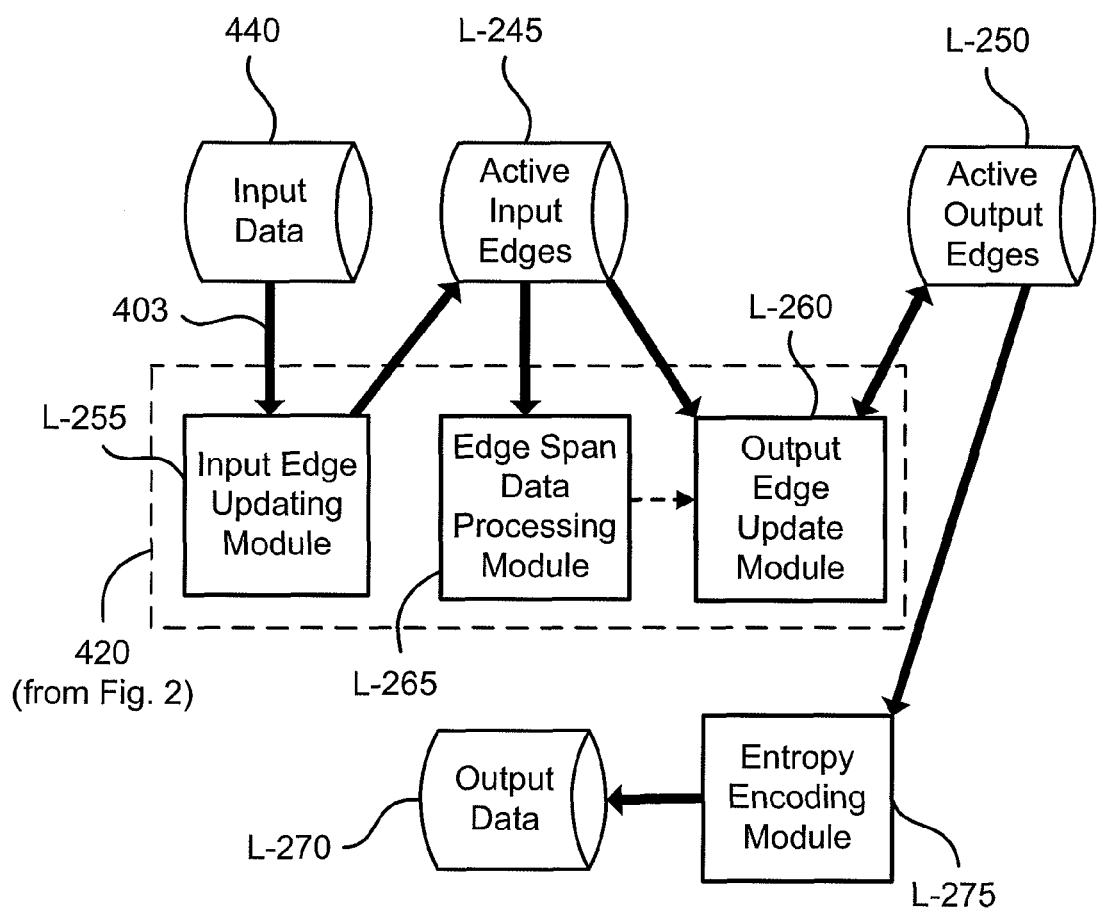
FIG. 5 is a data flow diagram of the SBEC edge scan conversion process, according to one example.

FIG. 5 is a data flow data flow diagram for a process for performing the scan conversion of vector input edges to pixel aligned output edges according to the SBEC approach. The scan conversion process is implemented by four modules, effected by the controller 170 running the program 140, namely an Input Edge Updating module L-255, an Edge Span Processing Module L-265, an Output Edge Update Module L-260, and an Entropy Encoding Module L-275. These modules are implemented on the printer processor 170 of the system of FIG. 1 as part of the primitives processor 420 described above with reference to FIG. 2.

Input Data 440 comprising vector input edges and referenced levels containing fills is analysed by the Input Edge Updating Module L-255. At each scanline, the Input Edge Updating Module L-255 determines (a) the set L-245 of vector input edges from the first set of primitives 440 that intersect the current scanline, and (b) the fill compositing sequence activated by each of the vector input edges in the Active Input Edge List L-245. This set L-245 of vector input edges, together with their corresponding activated fill compositing sequences are maintained as an Active Input Edge List L-245. At every scanline, the Input Edge Updating Module L-255 adds vector input edges to and removes them from the Active Input Edge List L-245, as these edges become active or are terminated on the current scanline, respectively. Also, the Input Edge Updating Module L-255 keeps the Active Input Edge List L-245 sorted in ascending X order, according to the X coordinate of each vector input edge within the Active Input Edge List L-245. The ordering is implemented preferably in form of a list, and accordingly the set L-245 is referred to as the Active Input Edge List L-245.

At each scanline, the Edge Span Data Processing Module L-265 processes each vector input edge from the Active Input Edge List L-254 in the order in which these edges are sorted in the Active Input Edge List L-245. The Output Edge Update Module L-260 is then invoked by the Edge Span Data Processing Module L-265 whenever the pixel aligned output edge associated with a vector input edge being processed, needs to be updated. The Output Edge Update Module L-260 maintains the set of pixel aligned output edges L-250 associated with the active vector input edges in the Active Input Edge List L-245 in a data structure referred to as the Active Output Edges List L-250. The members of the Active Output Edges List L-250 are also sorted, in one example, in ascending X order, according to their X coordinates of intersection with current scanline. The ordering is implemented preferably in form of a list, and accordingly the set L-250 is referred to as the Active Output Edge List L-250.

Whenever a pixel aligned output edge is terminated, the pixel aligned output edge is removed from the Active Output Edge List L-250 and the information about the edge is written into an Output Data Store L-270. At the end of processing the Output Data Store L-270 will contain all the pixel aligned output edges that form the regions of the fillmap in the second set of primitives 450. This process is performed by an Entropy Encoding Module L-275, which is in charge of the task of choosing the most compact encoding depending on the complexity of the pixel aligned output edge.

Figure 6:
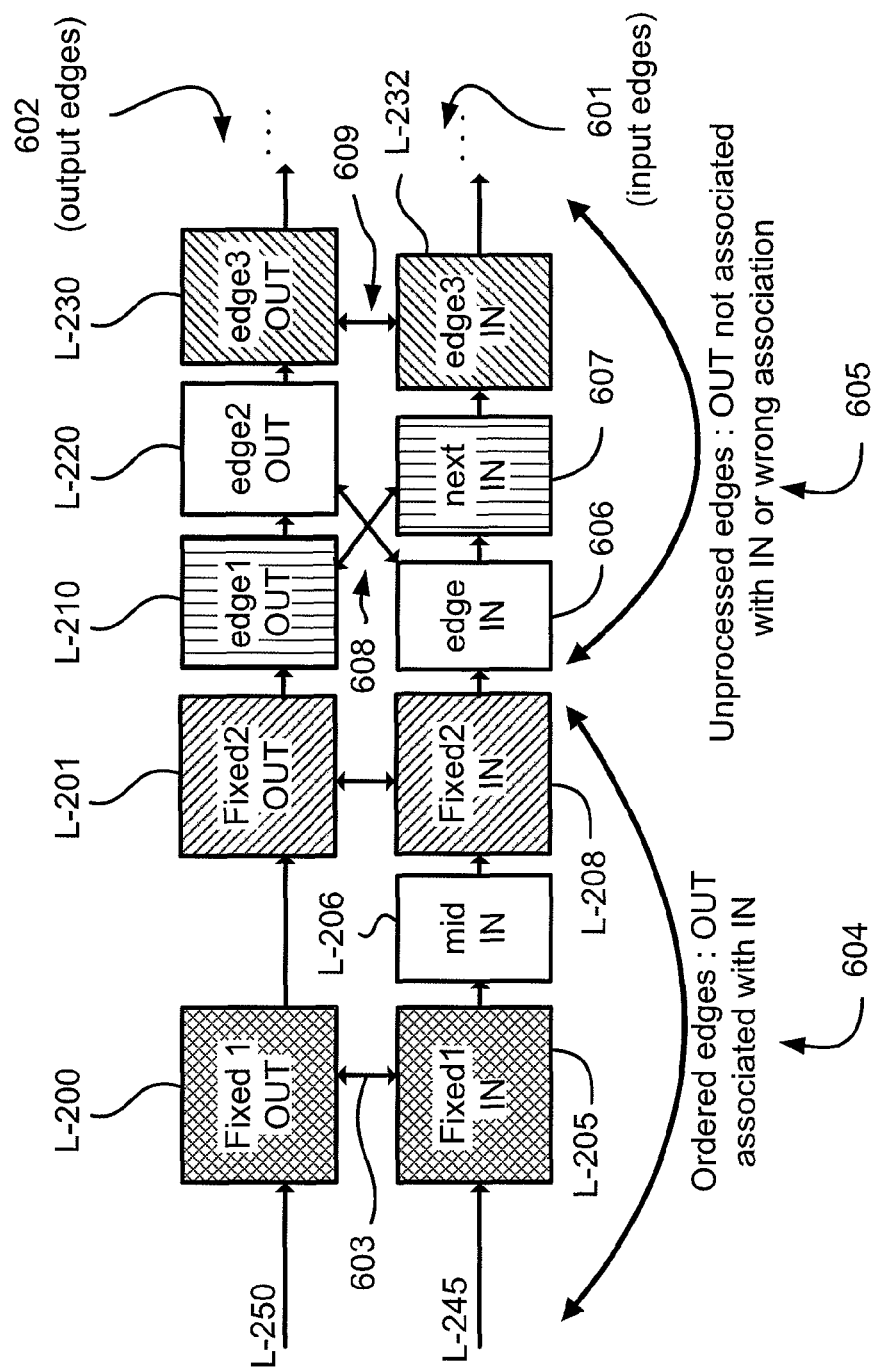
FIG. 6 is a data flow diagram depicting the relationship between a list of input edges and the list of corresponding output edges according to one example of the SBEC approach.

FIG. 6 illustrates how the association of the pixel aligned output edges (in the Active Output Edge List L-250) to vector input edges (in the Active Input Edge List L-245) is established and maintained according to the SBEC method.

The order of the vector input edges in the Active Input Edge List L-245 can change between consecutive scanlines, because some vector input edges can cross between scanlines, while other vector input edges may be terminated, and new edges may become activated. The order of the vector input edges in the Active Input Edge List L-245 reflects the order of the X coordinate at which each of each vector input edge intersects the current scanline.

"Links" (which are depicted by arrows such as 603) between vector input edges (such as L-205) in the Active Input Edge List L-245 and pixel aligned output edges (such as L-200) in the Active Output Edge List L-250 depict the association between pixel aligned output edges in the Active Output Edge List L-250 and vector input edges in the Active Input Edge List L-245. These associations are one-to-one, meaning that a pixel aligned output edge (such as L-200) in the Active Output Edge List L-250 is associated with at most one vector input edge (such as L-205) in the Active Input Edge List L-245.

Thus for example the pixel aligned output edge L-200 is associated with the vector input edge L-205, as shown (a) by their mutual link 603 and (b) by the identical cross-hatching of the rectangle denoting the pixel aligned output edge L-200 and of the rectangle denoting the vector input edge L-205. The aforementioned association indicates that both edges L-200 and L-205 activate the same fill compositing sequence.

Some vector input edges in the Active Edge List L-245, for example edge L-206, do not have associated pixel aligned output edges. Such a case occurs when the vector input edge is hidden, or when the length of the run of pixels between said vector input edge, and the next vector input edge on the current scanline is zero. The pixel aligned output edges however, are never hidden and activate non-zero runs of pixels which will be filled by the corresponding fill compositing sequence. During scan conversion, the lists L-250 and L-245 are each processed sequentially from left to right, once per scanline. The list of pixel aligned output edges L-250 is updated during processing of each scan line.

The Active Output Edge List L-250 is partitioned into two sub-lists. The first sub-list (as depicted by the text at the reference numeral 604) contains those pixel aligned output edges which are active on the current scanline and have been associated with the correct vector input edge for the current scanline. The second sub-list (as depicted by the text at the reference numeral 605) contains those pixel aligned output edges which are active on the current scanline and have not yet been associated with the correct vector input edge for the current scanline. The vector input edge associated with any given pixel aligned edge in the second sub-list may be valid for the current scanline, though this association is yet to be verified and updated by the processing for the current scanline.

As shown in FIG. 6, the pixel aligned output edges L-200 and L-201 have been updated (as depicted by the text at the reference numeral 604), and in the present example they remain associated with their respective vector input edges L-205 and L-208. The remaining pixel aligned output edges from an edge L-210 to the end (not shown) of the Active Output Edge List L-250 are yet to be processed (as depicted by the text at the reference numeral 605).

The output edges L-210 and L-220 can either be reassociated with respective new active input edges or terminated, as the vector input edges 606 and 607 which were associated with these output edges L-210 and L-220 on the previous scanline have now crossed (as depicted by crossed links 608), making these associations invalid. It is noted in this regard that links that cross other links indicate that the order of the respective vector input edges (such as 606 and 607 in this example) has changed, and hence the pixel aligned output edge associated with each of these vector input edges (such as 606 and 607 in this example) can either be reassociated with respective new active input edges or terminated.

For a pixel aligned output edge L-230, the association with vector input edge L-232 remains valid. This is indicated by (a) the fact that the same cross-hatching is used to highlight both the vector input edge L-232 and the pixel aligned output edges L-230, and (b) the fact that the link 609 between the edges does not cross any other links.

For the pixel aligned output edge L-230, the update process will simply extend its offset array with the new coordinate of its associated vector input edge L-232 on the current scanline, without need for any further changes.

During the processing for the current scanline, some of the pixel aligned output edges 602 may be temporarily detached (disassociated) from an associated vector input edge in the set 601. For example, the pixel aligned edges L-210 and L-220 are detached from the vector input edges 607 and 606 respectively as their associations have become invalid on the current scanline. However, the pixel aligned output edges that have been processed, for example from L-200 to L-201 in FIG. 6, can be either associated with a new vector input edge, or terminated, before processing proceeds to the next scanline.

Figure 7B:
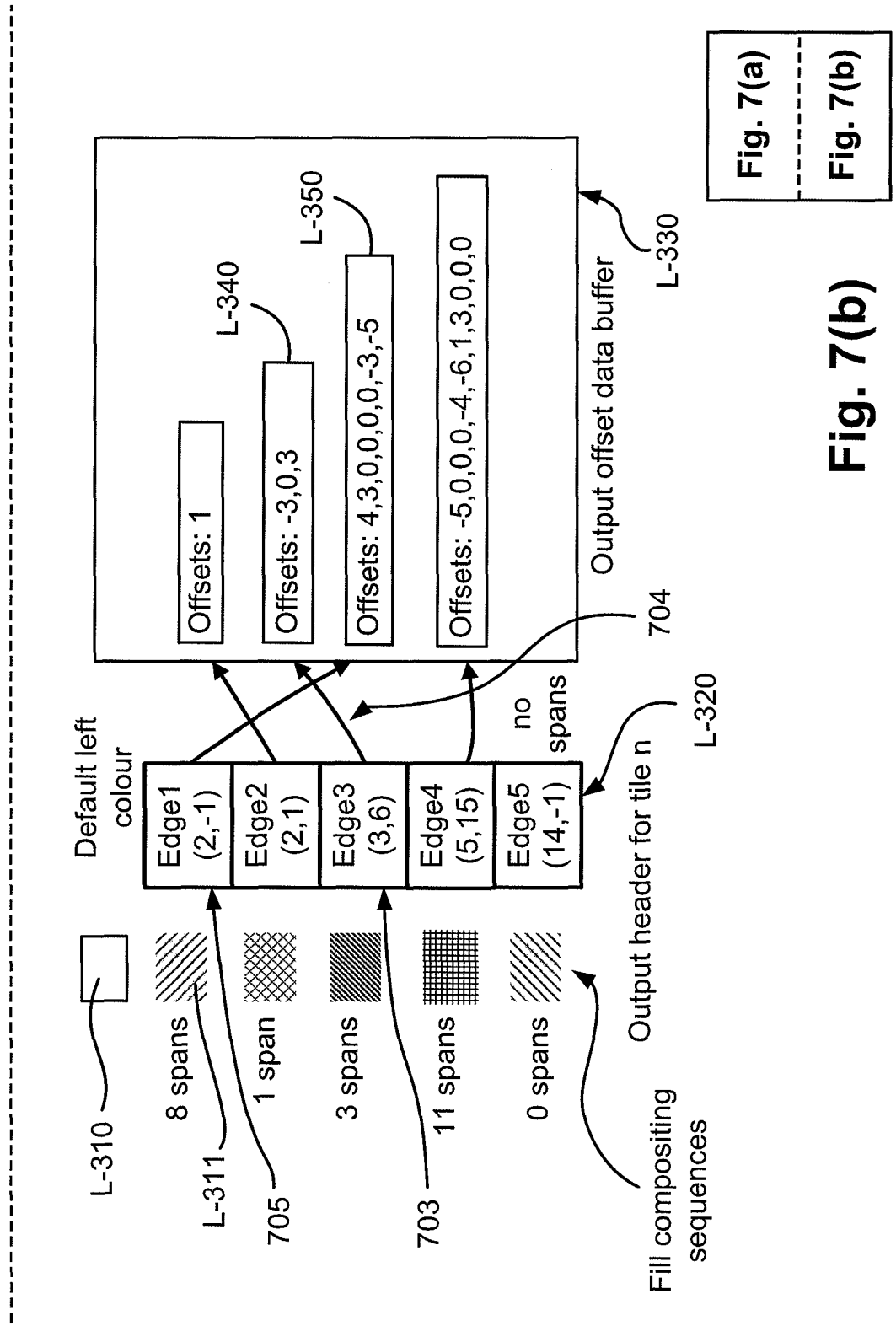
FIG. 7 depicts an example of scan converted data within one output tile, together with the output edge encoding, according to an SBEC arrangement.

FIG. 7 illustrates how the pixel aligned output edges in the Output Data List L-270 in FIG. 5 are represented. A single (current) tile L-300 of data is shown in FIG. 7. The tile size in this example is 16×16 pixels. Pixels are numbered from 0 to 15 in both rows and columns, counting from the top left corner 701. Edges on FIG. 7 divide the tile area into several regions, two of which are depicted by reference numerals 708 and 709. Each region contains a set of pixels of identical colour. Pixels of identical colour are depicted in FIG. 7 as pixels having identical cross-hatching patterns. Pixel colours in the tile L-300 indicate the fill compositing sequences that will be used by to evaluate the resultant colour of the pixels.

Some of the edges in the tile L-300 cross the left vertical tile boundary 706 (also referred to as the left vertical tile edge). In those cases, the SBEC approach ensures that the colour of each pixel (see 710 for example) adjacent to such an edge 706 can be determined independently of data associated with other tiles, and without examining the edge segments that cross into neighbouring tiles As shown in FIG. 7, some of the edges that are contained entirely within previously processed tiles (such as 711) may influence the colour of pixels within the current tile L-300. An example of such an edge is Edge 5. In such cases the left tile fill compositing sequence change events are encoded within the current tile. Such events are preferably in the form of marker edges. A marker edge is a pixel aligned output edge with a single starting point X (−1), to indicate a change in the left tile fill compositing sequence at the scanline on which the marker edge starts.

In the preferred SBEC embodiment, output data for the current tile L-300 in the Output Data Store L-270 consists of a default left tile fill compositing sequence L-310, an output edge header L-320, where edge start positions, referenced fill compositing sequences and pointers to the offset data for each edge are stored, and edge offset data such as L-340, which is stored in an output offset data buffer L-330. Edge start positions are represented in the output edge header L-320 by pairs of (Y,X) coordinates (such as 703) in which the Y coordinate represents the starting scanline of the edge in question, and the edge crosses the scanline Y between pixels at columns defined by X−1 and X. The output offset data buffer L-330 is shared by all tiles in the fillmap. For clarity, only the output header L-320 for the current tile L-300 and the corresponding offset data in the output offset data buffer L-330 for the current tile are shown in FIG. 7.

Edges in the output header L-320 are stored in order of their starting scanline or the Y-coordinate of the edges start point, which is the creation order of the edges. Offset data in the output offset data buffer L-330 are stored in edge termination order, because the offset data is not written to the output data buffer L-330 until the associated output edge is terminated. The size of the offset data for each edge determines the length of that edge.

For example, Edge 3 in tile L-300 starts at scanline 3 between pixels 5 and 6 as indicated by (3, 6) pair (ie 703) in the output header L-320. The offset data L-340 for Edge 3 (identified by an arrow 704) indicates that this edge extends for 3 more scanlines, its respective X crossing positions with subsequent scanlines being successively shifted by −3, 0 and 3 pixels from the X crossing position on the previous scanline. Therefore, Edge 3 consists of a total of 4 segments and ends at the X coordinate of 6 between pixels 5 and 6.

Edge 1 starts in the tile immediately to the left of the tile L-300 in FIG. 7, before scanline 2, and then crosses to the tile L-300 at scanline 2. It then crosses back to the previous tile at scanline 9. For that reason, the starting X coordinate of Edge 1 is −1 rather than 4, as it would be if Edge 1 had started in tile L-300 and had not crossed over from the previous tile. In addition, the offset data L-350 of Edge 1 is prepended with an extra offset of 4 to indicate the first X coordinate of Edge 1 within tile L-300 is 4.

The last offset in the offset data L-350 of Edge 1 indicates that the edge's last X coordinate on scanline 9 is −1, which indicates that the edge is crossing to the previous tile after its last segment at (8, 4). Even though the part of Edge 1 inside tile L-300 consists of 7 segments and a start point of (2, 4), and offset data of length 6 would describe those segments, two extra offsets at the beginning and the end of the offset data L-350 are needed to indicate the events of Edge 1 crossing from the previous tile, and returning to the previous tile.

The fill compositing sequence L-311 referenced by Edge 1 is the next left tile fill compositing sequence L-302, rather than the colour of the pixels activated by Edge 1. Such an encoding of fill compositing sequence on Edge 1 in tile header L-320 takes place when the edge starts at an X coordinate of −1.

Whenever any edge in an output header such as L-320 starts at an X coordinate of −1 (eg see 705), or ends at an X coordinate of −1, the event of "an edge crossing the left tile boundary" occurs. This event means that the left tile colour changes as the result of the crossing. For example, in FIG. 7, the default left tile colour L-301, which applies from scanline 0 to scanline 1, is equal to the default left tile fill compositing sequence L-310. Then, from scanline 2 to scanline 8 the left tile colour becomes L-302 as the result of Edge 1 having the start coordinate X=−1 as seen at 705 in output header L-320. Then, from scanline 9 to scanline 13 the left tile colour becomes L-303 as the result of Edge 1 ending at coordinate X=−1 as can be calculated from the offset data L-350. Then, from scanline 14, the left tile colour becomes L-304 as the result of a marker Edge 5 in the output header L-320.

In order to recreate the fill compositing sequences for each pixel in tile L-300 from the data in the output header L-320 and the output offset data buffer L-330, the event of an edge crossing the left tile boundary and the associated changes in left tile colour is tracked. Therefore, although Edge 1 references fill compositing sequence L-311 (Edge 1 and the compositing sequence L-311 appear as adjacent entries in the output header L-320), the colour of the pixels activated by Edge 1 are derived using the default left tile colour L-301 which was active up until the Edge 1 left tile boundary crossing 706, at which point a new left tile colour becomes active, which is the fill compositing sequence L-311 referenced by Edge 1 in the output header L-320. Finally, the last coordinate of Edge 1 at scanline 9 being defined to be −1, as the edge crosses the left tile boundary at the point 707, the left tile colour changes to the colour activated L-301 by Edge 1, which is also the default left tile colour L-301.

Edge X lies entirely within the previous tile, but activates pixels within the tile L-300. Edge X does not need to be encoded in the output header L-320, because the colour of the pixels activated by Edge X within the tile L-300 can be determined by the process of left tile colour changes triggered by Edge 1, as described above.

Even though Edge 1 crosses back to the previous tile at line 10, it is treated as if it terminated at line 9, with the last coordinate X=−1. Removing those segments of Edge 1 that run along the tile boundary before finally crossing to the previous tile does not have an effect on the reproduced output image, but saves the amount of data to be encoded as edge offsets.

Edge 2 and Edge 3 lie entirely within the current tile L-300, and their starting positions, colours and offset tables are represented as depicted in the output header L-320 and the output offset data buffer L-330.

Edge 4 touches the left edge 702 of the tile at line 11 but does not cross it, so the left tile fill compositing sequence at scanline 11 is not affected. One edge segment 713 of Edge 4 runs between pixel columns 9 and 10, running on the right hand side of a pixel boundary 712.

Edge 5 lies entirely within the previous tile, but activates pixels with the current tile L-300. Edge 5 is thus encoded as a marker edge with a single starting point X (−1) to indicate a change in the left tile fill compositing sequence at scanline 14, to the fill compositing sequence activated by Edge 5.

Figure 8:
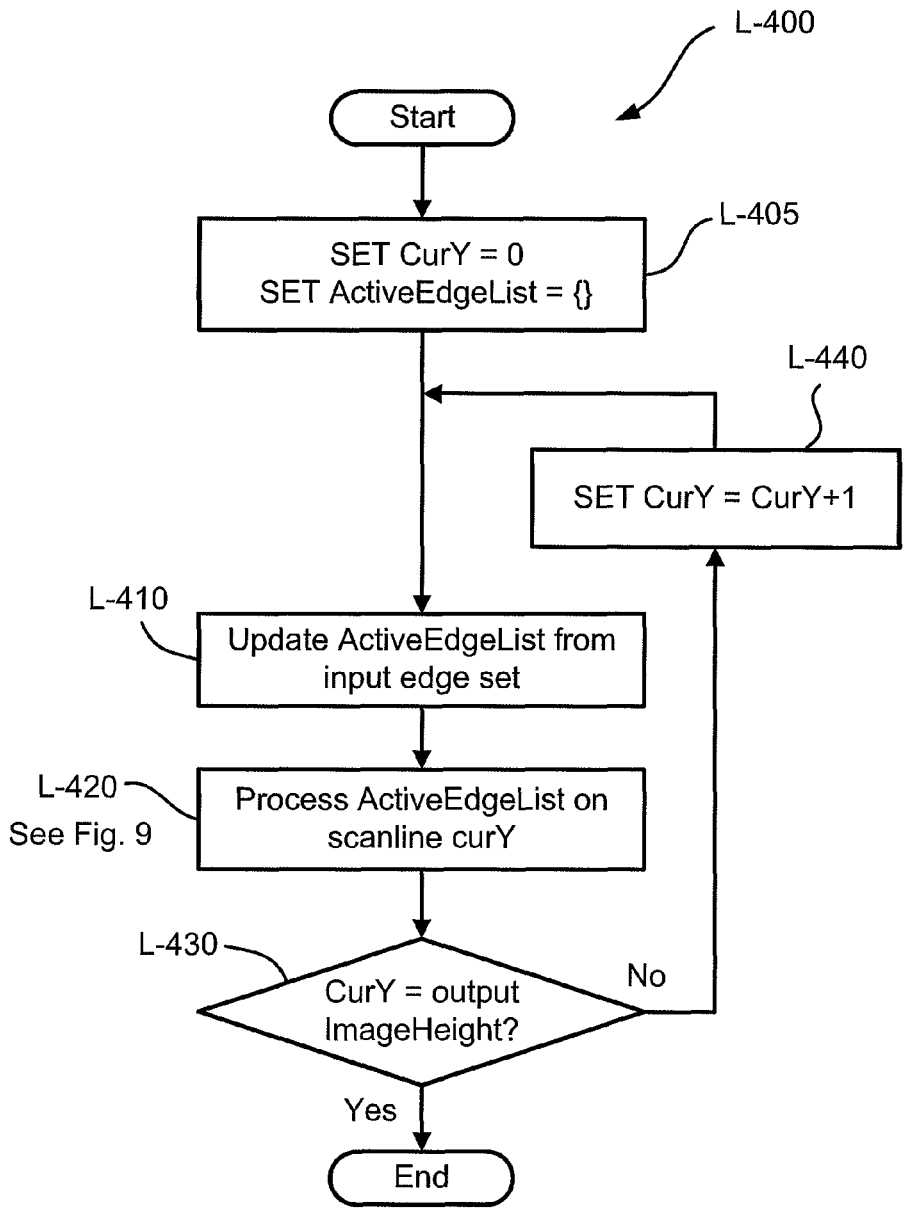
FIG. 8 is a flow diagram illustrating an SBEC pixel sequential scan conversion process.

FIG. 8 is a flow diagram illustrating the pixel sequential scan conversion method L-400, effected by the controller 170 running the program 140, used by the Primitives Processor 420 in FIG. 2. The scan conversion method starts at step L-405 where the variable CurY, representing the index of current scanline, is set to 0, and the array variable ActiveEdgeList, representing the list of vector input edges crossing the current scanline (ie the Active Input Edge List L-245 in FIG. 5), is set to the empty list. Execution moves to the step L-410 where the ActiveEdgeList is updated by the Input Edge Updating Module L-255. During the update process, the vector input edges that start at scanline CurY are added to ActiveEdgeList (ie the Active Input Edge List L-245 in FIG. 5) and the vector input edges that terminate at scanline CurY are removed from ActiveEdgeList. Also, the X coordinate of each vector input edge's intersection with the current scanline is updated for all edges to reflect the current position of each vector input edge on the current scanline.

Execution then proceeds to the step L-420 where the actual processing of the vector input edge data, and updating of the pixel aligned output edge data takes place. Step L-420 is also executed by the Input Edge Updating Module L-255. This step will later be described in detail with reference to FIG. 9. Next, a decision block L-430, effected by the controller 170 running the program 140, checks whether the end of the image has been reached (it determines if all scanlines in the image have been processed). If it is determined that there are no more scanlines to process, execution terminates, otherwise, the variable CurY is incremented in block L-440, and execution returns to step L-410.

Figure 9:
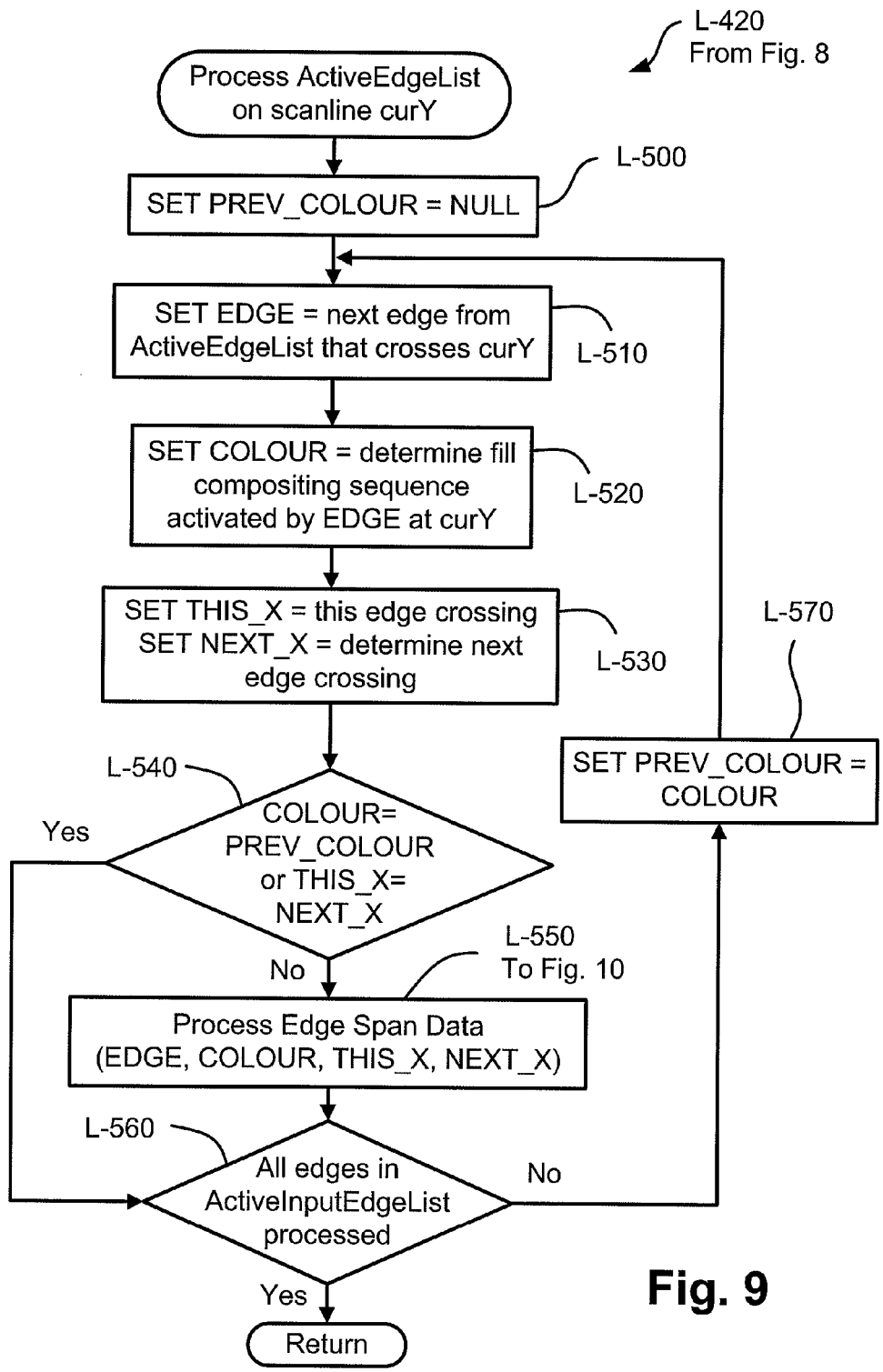
FIG. 9 is a flow diagram illustrating processing of a single scanline in the process of FIG. 8.

FIG. 9 is a flow diagram depicting an example of how the step L-420 in FIG. 8, effected by the controller 170 running the program 140, for processing the input edges in ActiveEdgeList (ie the Active Input Edge List L-245 in FIG. 5), is performed. Processing starts with step L-500, which assigns the null value to the variable PREV_COLOUR, which stores the previously processed fill compositing sequence on the current scanline. Next, a step L-510 determines the next vector input edge EDGE from ActiveEdgeList L-245 that crosses the current scanline and which has not been processed on this current scanline. The determination involves sorting the edges in ActiveEdgeList L-245, so that the edge with the lowest X position on the current scanline, and which is yet to be processed, is chosen in the step L-510. Next, a step L-520 determines the fill compositing sequence COLOUR activated by the edge stored in the variable Edge by the step L-510. Next, the step L-530 determines the pixel position THIS_X where the edge determined in the step L-510 crosses the scanline CurY. Also, the pixel crossing position NEXT_X of the next vector input edge, or the right image boundary if the next edge does not exist, is determined.

A decision block L-540 checks if the edge determined in the step L-510 activates a non-zero span of pixels and if the fill compositing sequence activated by the edge store in the variable Edge (ie the fill compositing sequence stored in the variable COLOUR) differs to the fill compositing sequence that was previously active (ie the fill compositing sequence stored in the variable PREV_COLOUR). If the present span of pixels is non-zero, i.e. when THIS_X is not equal NEXT_X, and the fill compositing sequence activated by this edge is different to the fill compositing sequence active before this edge, the next step L-550 is executed. Otherwise, step L-550 is skipped.

Such a formulated condition in the step L-540 ensures that the span processing in step L-550 is executed once per non-zero span of pixels. If two consecutive runs of pixels are to be filled with the same fill compositing sequence, these runs will be merged to form a single span, which is processed only once, resulting in the single output edge. The step L-550 takes the four input variables, the current vector input edge EDGE, the fill compositing sequence COLOUR activated by this edge, the coordinate THIS_X of this edge crossing with the current scanline, and the end NEXT_X of the span of pixels activated by this edge, and updates the pixel aligned output edge data with that information. The step L-550 is executed by the Edge Span Data Processing Module L-265. The processing in step L-550 will later be described in more detail with reference to FIGS. 10A and 10B.

Next, the decision block L-560 checks if all edges in ActiveEdgeList L-245 have been processed. If so, the execution control returns to the main loop of the method L-400 described in FIG. 8, having completed step L-420. Otherwise, the current fill compositing sequence COLOUR is assigned to the previously processed fill compositing sequence PREV_COLOUR in step L-570, and the execution returns to the step L-510.

Figure 10A:
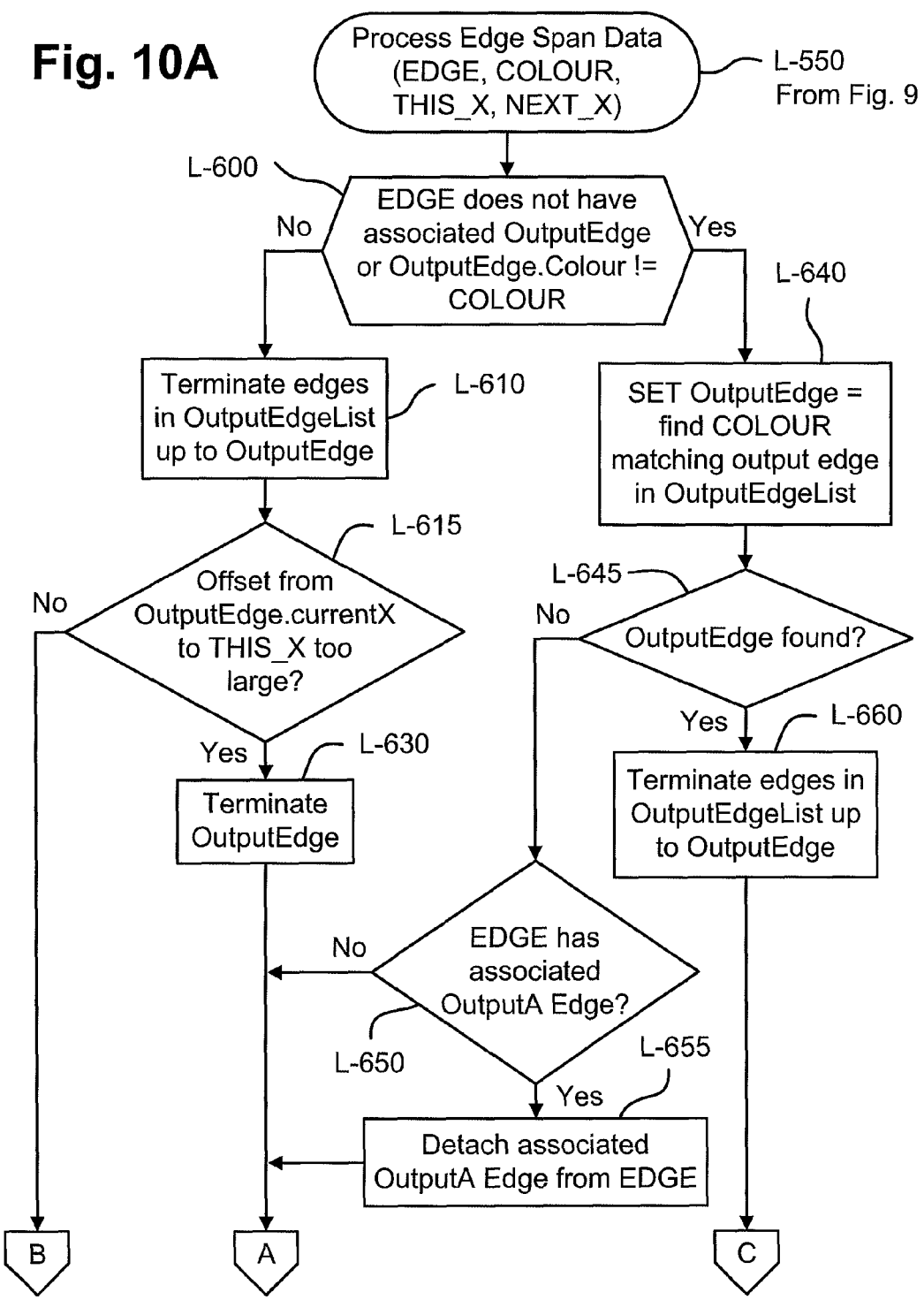
FIGS. 10A and 10B are flow diagram fragments depicting span data processing in the process of FIG. 9.
Figure 10B:
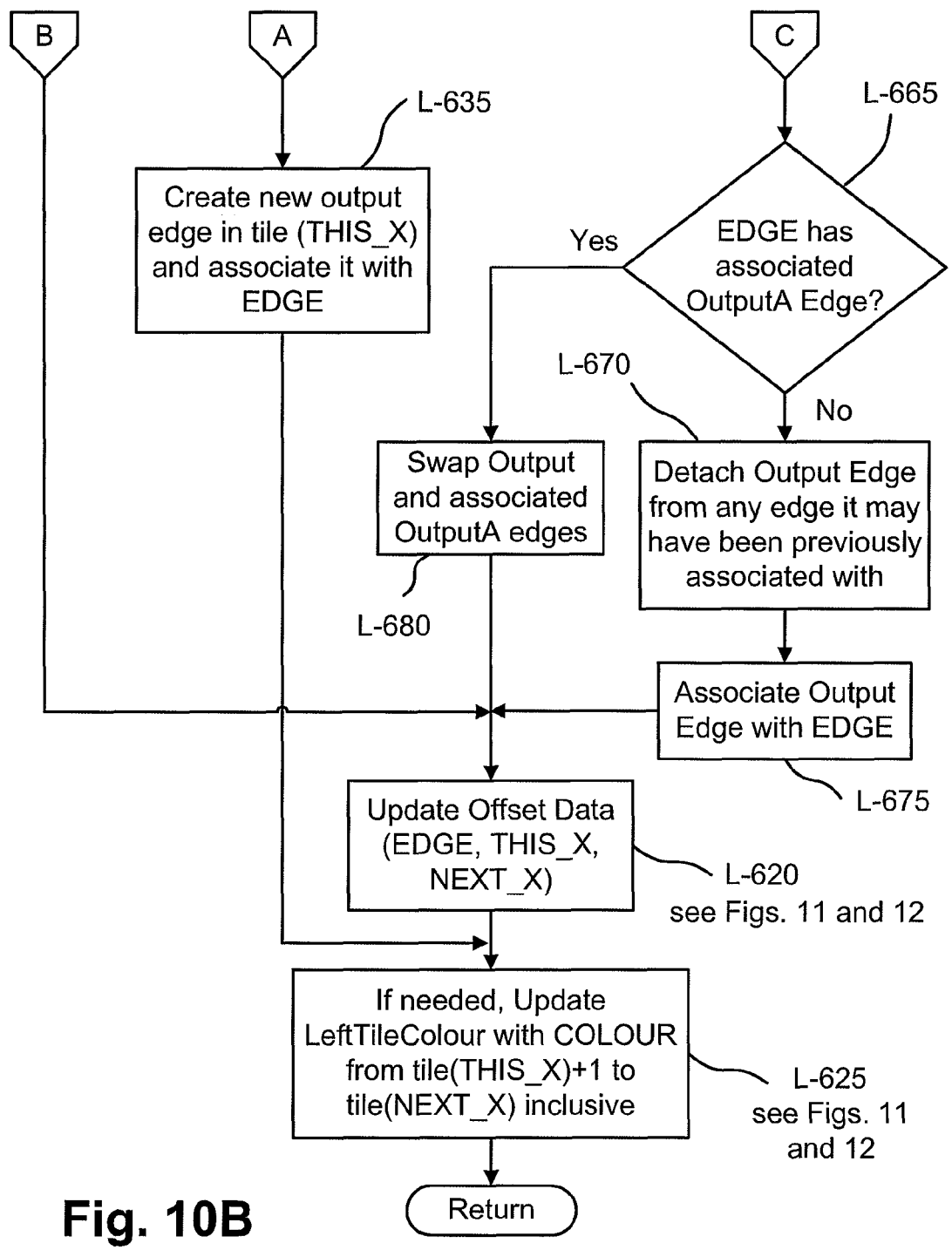

FIGS. 10A and 10B are flow diagram fragments depicting an example of how the processing, effected by the controller 170 running the program 140, of the span data by the step L-550 in FIG. 9 can be performed.

FIG. 10A shows how processing starts in a decision block L-600 which determines whether the vector input edge is associated with an pixel aligned output edge, and given that a vector input edge has an associated pixel aligned output edge, whether the fill compositing sequences activated by both edges are the same. If so, the association is valid, and the pixel aligned output edge can be extended along the vector input edge. Execution control then moves to a step L-610, where unprocessed pixel aligned output edges in the active output edge list L-250 (referred to by the array variable OutputEdgeList) are terminated up to the OutputEdge determined in the step L-610. The process of terminating a given active output edge is described later with reference to step L-630.

The termination of all prior active pixel aligned output edges prevents a pixel aligned output edge from crossing another pixel aligned output edge during further processing. Next, the execution proceeds to a decision block L-615 which determines if the X offset data (such as L-340 in FIG. 7), which is the difference between the OutputEdge X coordinate currentX and the new X coordinate THIS_X is possible to encode. The offset may be impossible to encode if for example, it is too large. If the X offset cannot be encoded, then control moves to step L-630 where the OutputEdge is terminated. In the termination process, the OutputEdge is removed from the Active Output Edge list L-250 and its data, including the start point, offset table and the reference to the fill compositing sequence is encoded by the Entropy Encoding Module L-275 into the Output Data L-270. After OutputEdge is terminated, the vector input edge EDGE is not associated with any output edge. To maintain a valid association, a new pixel aligned output edge OutputEdge has to be created. Hence, control moves to a step L-635 (in FIG. 10B) where the new pixel aligned output edge OutputEdge is created. The pixel aligned output edge OutputEdge is removed from the sub-list of unprocessed edges in the Active Output Edge list L-250 and inserted at the end of the sub-list containing those pixel aligned output edges which are active on the current scanline and have been associated with the correct vector input edge for the current scanline. The pixel aligned output edge OutputEdge is also associated with the vector input edge EDGE.

If the decision block L-615 in FIG. 10A decides that the X offset is possible to encode, then the pixel aligned output edge OutputEdge is removed from the sub-list of unprocessed edges in the Active Output Edge list L-250 and inserted at the end of the sub-list containing those pixel aligned output edges which are active on the current scanline and have been associated with the correct vector input edge for the current scanline, and execution proceeds to the block L-620 in FIG. 10B.

Next, in block L-620 the offset data table L-330 associated with the pixel aligned output edge OutputEdge is updated. Within block L-620, a check to determine whether the pixel aligned output edge OutputEdge stays within its tile boundaries is also made. Block L-620 is described in more detail below with reference to FIG. 11A. After the steps L-620 and L-635, a step L-625 is executed whenever there is the possibility of a left tile fill compositing sequence change for the tiles affected by the span of pixels from THIS_X to NEXT_X. Such a possibility arises, for example, when THIS_X belongs to a tile different from the tile NEXT_X belongs to, and there was a change of fill compositing sequence, for example as a result of creating or terminating an edge. The details of the steps L-620 and L-625 are described later with reference to FIGS. 11 and 12. After the steps L-620 and L-625, the execution returns to the process L-420 (described in FIG. 9), and proceeds to step L-560.

In case the decision block L-600 determines, that there is no valid association of an pixel aligned output edge OutputEdge with the vector input edge EDGE or the fill compositing sequences activated by the vector input edge EDGE and its associated pixel aligned output edge are different, execution moves to step L-640. The step L-640 traverses the unprocessed pixel aligned output edges in OutputEdgeList L-250, in an attempt to find a pixel aligned output edge that can be associated with the vector input edge EDGE. The main search criterion is that the fill compositing sequences activated by the vector input edge and pixel aligned output edge are the same. Another criterion is that the offset from the current X in the pixel aligned to THIS_X is not too large, as per the condition in the step L-615. Other criteria may be possible, to narrow down the search. If pixel aligned output edge is found which meets the aforementioned criteria, the pixel aligned output edge found is stored in the variable OutputEdge.

Next, a decision block L-645 moves the execution to step L-660, if the matching pixel aligned output edge OutputEdge has been found. In the step L-660, all the unprocessed pixel aligned output edges active in the OutputEdgeList L-250, prior to the matching pixel aligned output edge OutputEdge, are terminated. As in the step L-610, the termination of all prior active pixel aligned output edges prevents an output edge from crossing another output edge during further processing.

The execution proceeds to a decision block L-665 in FIG. 10B which determines whether the vector input edge EDGE has been associated with another pixel aligned output edge. If affirmative, the control moves to a step L-680 where, by swapping the output edges found in the steps L-640 and L-665, the association of the correct pixel aligned output edge with the vector input edge EDGE is achieved. Otherwise, the vector input edge EDGE should be associated with the pixel aligned output edge OutputEdge found in step L-640. But if the pixel aligned output edge OutputEdge has been associated with any other vector input edge, it is detached from that vector input edge beforehand. The detachment happens in a step L-670 after which the association of pixel aligned output edge OutputEdge with vector input edge EDGE is performed in a step L-675.

After the step L-675 or the step L-680 the association of the correct pixel aligned output edge with the vector input edge is achieved. The pixel aligned output edge OutputEdge is also removed from the sub-list of unprocessed edges in the Active Output Edge list L-250 and inserted at the end of the sub-list containing those pixel aligned output edges which are active on the current scanline and have been associated with the correct vector input edge for the current scanline. Processing then proceeds to the step L-620 as described above.

If a pixel aligned output edge has not been found in the step L-640 (in FIG. 10A), the decision block L-645 moves the execution to step L-650 where it is determined if the vector input edge EDGE has been previously associated with any pixel aligned output edge. If affirmative, the pixel aligned output edge associated with the vector input edge EDGE is detached from the vector input edge Edge in a step L-655. After the execution of the branch starting from the block L-650, and just prior to the processing of step L-635, the vector input edge EDGE is not associated with any pixel aligned output edge. Processing then proceeds to the step L-635 in FIG. 10B as described above.

The step L-620, executed by the Output Edge Update Module L-260, is performed in all cases where the step L-550 in FIG. 9 has, up to this point, achieves the correct association of a pixel aligned output edge with the vector input edge. In that case, the offset data array L-330 of the pixel aligned output edge associated with the vector input edge is extended with an extra value THIS_X. The step L-620 also checks the case in which the edge moves across a vertical tile boundary and updates the edge data accordingly. The step L-620 will be described in more detail later with reference to FIG. 11A.

The step L-635 (in FIG. 10B) is performed in all cases in which the step L-550 in FIG. 9 has, up to this point, achieved the state in which the vector input edge is not associated with any pixel aligned output edge. In the step L-635 a new pixel aligned output edge is created and associated with the vector input edge.

In all cases, the edge span processing data of step L-550 (in FIG. 9) is concluded by the step L-625 (in FIG. 10B). In the step L-625, executed by the Output Edge Update Module L-260, the left tile fill compositing sequence is updated for all the tiles that the current span crosses, i.e. from the tile after the tile containing THIS_X to the tile containing NEXT_X. It should be noted that checking of the left tile fill compositing sequence update is necessary exclusively in cases involving pixel aligned output edge creation and pixel aligned output edge termination.

Figure 11A:
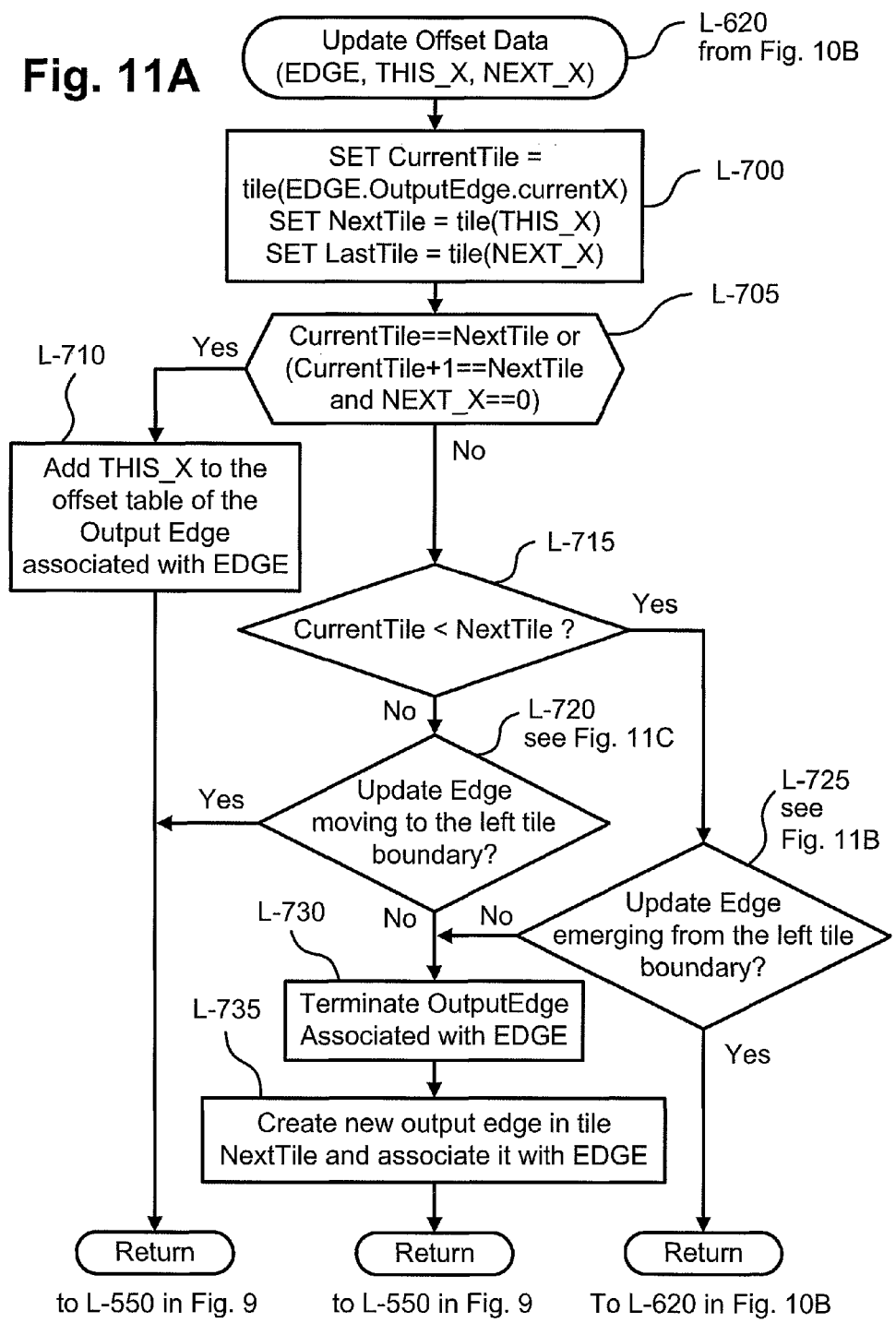
FIG. 11A is a flow diagram illustrating the process of updating the offset data in the output edge, as used in the method of FIG. 10B.
Figure 11B:
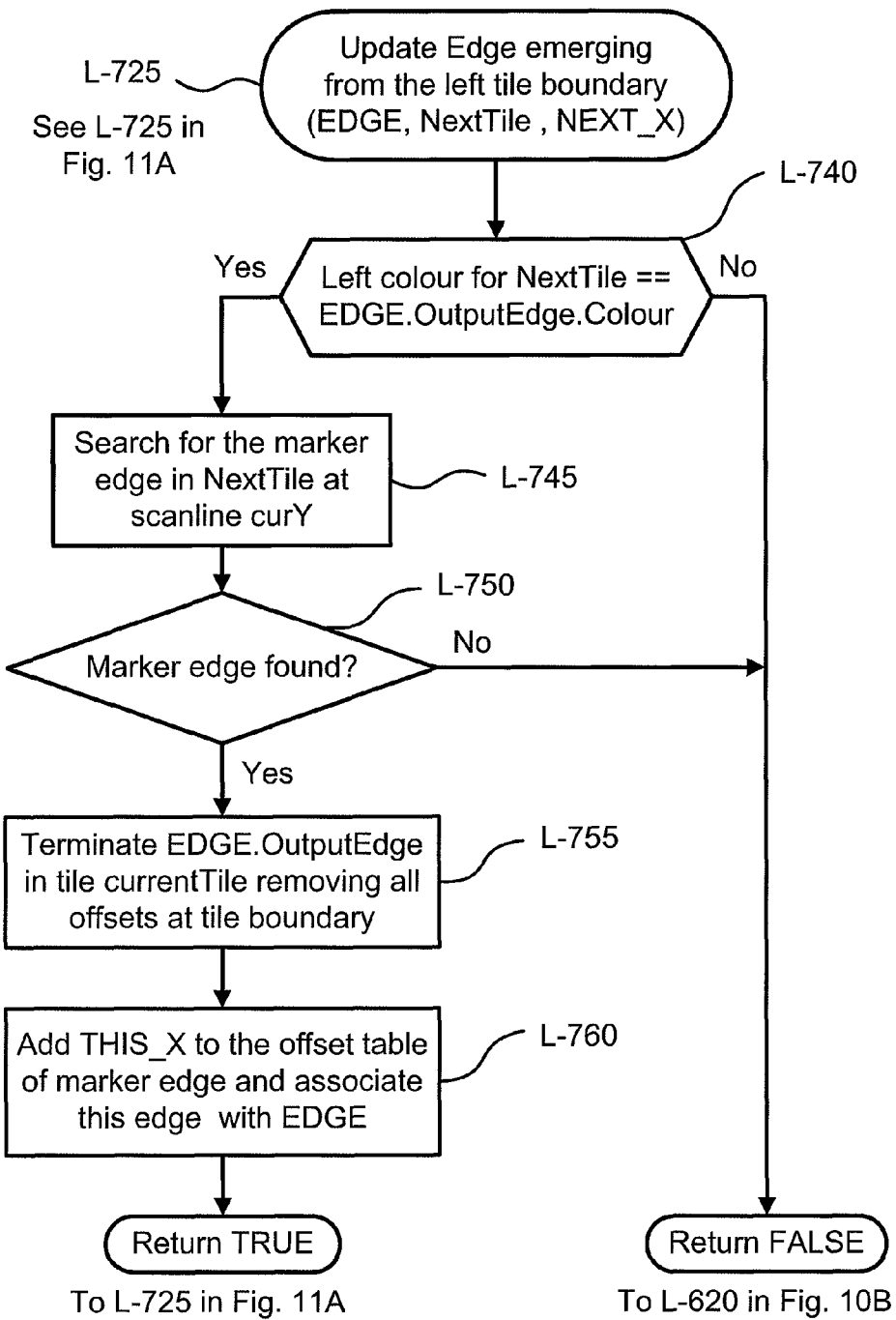
FIG. 11B is a flow diagram illustrating the process of updating the offset data for an edge that emerges from the left tile boundary, as used in the method of FIG. 11A.
Figure 11C:
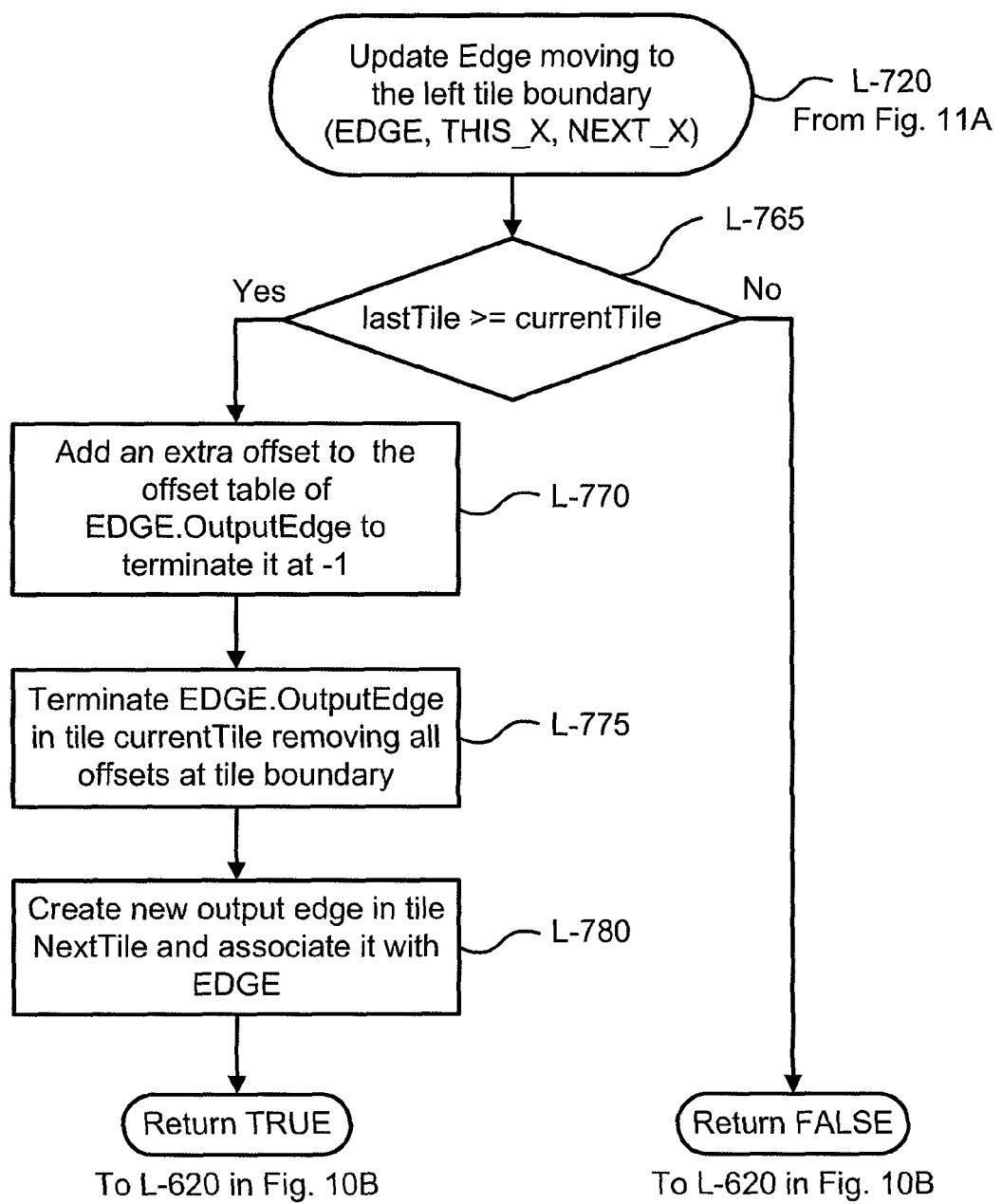
FIG. 11C is a flow diagram illustrating the process of updating the offset data for an edge that moves to the left tile boundary, as used in the method of FIG. 11A.

FIGS. 11A, 11B and 11C are flow diagrams illustrating the process, effected by the controller 170 running the program 140, of updating the offset data in the output edge, according to the step L-620 in FIG. 10B.

FIG. 11A starts with a step L-700, where the tile numbers are determined for three coordinates. CurrentTile becomes the tile number in which the currentX of the output edge associated with EDGE falls into. NextTile becomes the tile number THIS_X falls into. LastTile becomes the tile number the NEXT_X falls into. THIS_X is the X coordinate with which the output edge is to be extended. NEXT_X is the end of the span started by THIS_X. A following step L-705 determines if THIS_X falls into the same tile as OutputEdge.currentX. The determination is affirmative, not only when CurrentTile is equal to NextTile, but also when NEXT_X falls at the boundary between CurrentTile and NextTile. If the step L-705 returns a logical TRUE value, a following step L-710 is executed, where THIS_X is simply appended to the relevant entry in the offset table L-330 of the associated output edge, and control returns to the span processing step L-550 described in FIG. 10B, and proceeds to L-625. Otherwise, the execution moves to a step L-715 where it is decided which tile boundary crossing by the associated output edge has taken place.

Accordingly, dependent on whether currentTile<NextTile, either a subsequent step L-720 tries to perform an update of the edge moving to the left tile boundary, or a subsequent step L-725 tries to perform an update of the edge emerging from the left tile boundary. If the update by either L-720 or L-725 is successful, the step L-620 concludes and control returns to the span processing step L-550 in FIG. 10B. Otherwise the associated output edge cannot be updated and is terminated in a step L-730. Then a new output edge is created and associated with the input edge in a following step L-735 before the step L-620 concludes and control returns to the span processing step L-550.

The details of the step L-725 for updating the edge emerging from left tile boundary are described with reference to FIG. 11B.

FIG. 11B commences with a decision block L-740 that checks if the current left tile fill compositing sequence for NextTile is the same as the compositing sequence referenced by the associated output edge. If not, the output edge cannot be treated as emerging from the left tile and the update step L-725 returns negative to the step L-620 in FIG. 10B. If yes, there exists a marker edge in tile NextTile starting at the current scanline, which has been inserted into NextTile as the result of a left tile fill compositing sequence change in step L-625. Accordingly, a following step L-745 performs the search for such an edge.

Next, a decision block L-750 checks the result of the search. If such a marker edge is not found, the output edge cannot be treated as emerging from the left and the update process L-725 returns negative to the step L-620 in FIG. 10B. If a marker edge is found, its offset table can be initialised with THIS_X. In this case, firstly, the associated output edge is terminated in CurrentTile in a following step L-755. Before terminating the output edge, all of its offsets that were at the tile boundary between CurrentTile and NextTile are removed from its offset table. Then, in a following step L-760, THIS_X offset is added to the marker edge that was found in the step L-745 and the resulting edge is associated with the vector input edge EDGE. After the step L-760 the update step L-725 in FIG. 11A returns affirmative to step L-620.

The details of the step L-720 in FIG. 11A, for updating the edge moving to left tile boundary, are described with reference to FIG. 11C.

FIG. 11C commences with a decision block L-765 that checks if lastTile is greater than or equal to currentTile, i.e. if the current span extends over to the current tile. If not, the output edge cannot be treated as moving to the left tile and the update process L-720 returns negative to step L-620 in FIG. 11A. If yes, the control moves to a step L-770, where an extra offset is added to the associated pixel aligned output edge in order to terminate it at −1. That extra offset marks the edge as moving to the left tile boundary. Next, a step L-775 terminates the pixel aligned output edge, removing all offsets at the tile boundary between tiles CurrentTile and NextTile, except for the extra offset added at the step L-770. Then, a step L-780 creates the new edge in NextTile and associates it with the vector input edge. Then, the update process L-720 returns an affirmative indication to the step L-620 in FIG. 11A.

Figure 12:
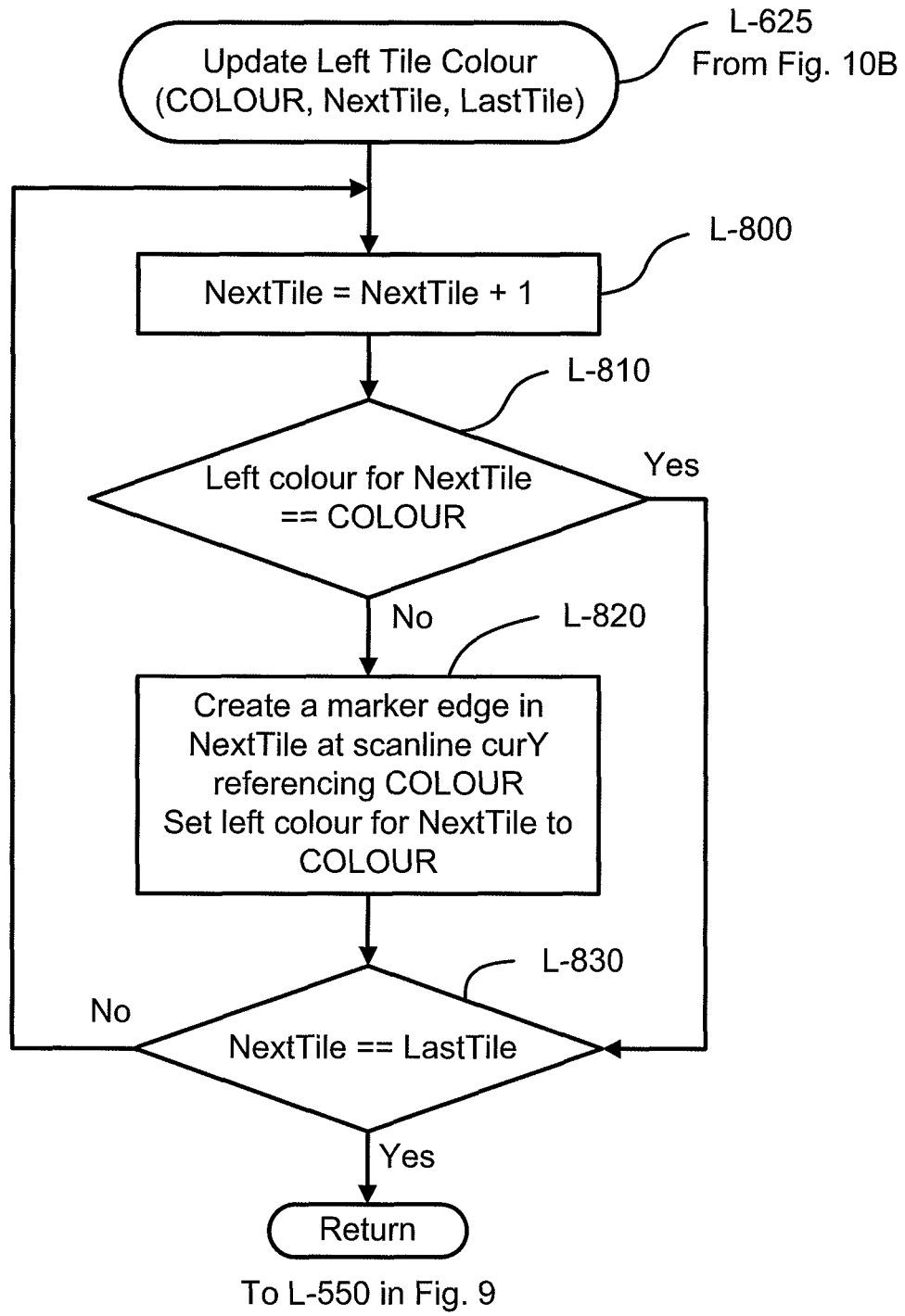
FIG. 12 is a flow diagram illustrating the process of updating the left tile fill compositing sequence, as used in the method of FIG. 10B.

FIG. 12 is a flow diagram illustrating the process, effected by the controller 170 running the program 140, of updating the left tile fill compositing sequence for the tiles spanning the current span, according to one example of the process L-625 in FIG. 10B. The process L-625 in FIG. 12 starts with a step L-800, where the variable NextTile is incremented. The variable NextTile indicates the tile number for which updating is being performed for the left tile fill compositing sequence.

Next, a decision block L-810 checks if the current left tile fill compositing sequence for the variable NextTile is the same as the fill compositing sequence COLOUR that is being used for updating. If not, a step L-820 is executed, where a marker edge is created at the current scanline in NextTile. This marker edge indicates that the left tile fill compositing sequence changes in NextTile. Also, the current left tile fill compositing sequence of the tile NextTile is updated in the step L-820.

If the decision block L-810 returns a logical TRUE value, the step L-820 is skipped.

The execution proceeds to a decision block L-830, where it is checked if NextTile is equal to the LastTile in the range of tiles into which the current span falls. In the case where NextTile is equal to LastTile, the tile with the tile number NextTile falls outside of the range of tiles covered by the current span, and the processing returns to the span data processing step L-550 in FIG. 10B. Otherwise, the execution loops back to the step L-800, to process the following tile.

FIGS. 13A-D are fragments of a schematic flow diagram illustrating an example L-1300 of a process, effected by the controller 170 running the program 140, for rendering the output data L-270 for a tile like that shown in FIG. 7.

The process L-1300 is preferably implemented in the Pixel Sequential Rendering Apparatus 180 in the system of FIG. 1. The process L-1300 uses the second set of primitives 450 to render the page 500 to pixels. The output of the process L-1300 is colour pixel data, which may be used by printer engine 195.

Figure 13A:
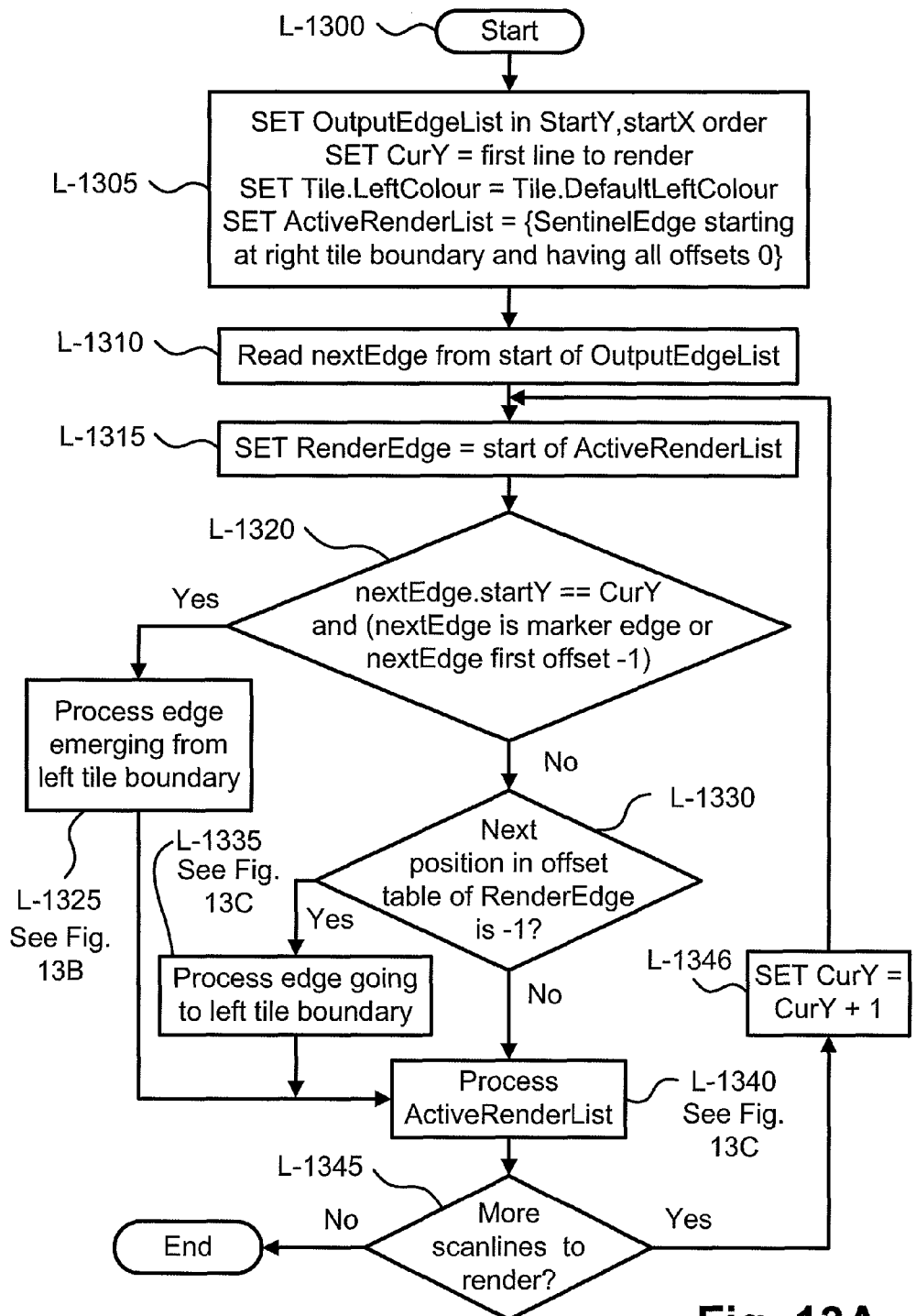
FIGS. 13A-D are fragments of a schematic flow diagram illustrating the process of rendering the output tile data generated using an SBEC method.

FIG. 13A depicts the rendering process L-1300, effected by the controller 170 running the program 140, that starts at a step L-1305 where various initializations take place. The list OutputEdgeList L-250 is generated by decoding the encoded pixel aligned output edges stored within OutputData 270, which is produced by the method L-400 in FIG. 8 in startY, startX order. Pixel aligned output edges within the list OutputEdgeList L-250 are to be read in the same order as they are produced by the method L-400 in FIG. 8. The current scanline CurY is set to the first scanline of the tile. The variable LeftColour, representing the left colour of the tile at the current scanline, is set to the default left colour. At the conclusion of the step L-1305 the list ActiveRenderList, which comprises the list of those edges from OutputEdgeList that intersect the current scanline CurY, is set to having a single element referred to as SentinelEdge. SentinelEdge forms the right tile boundary, has an 'infinite' offset table, and is never removed from the ActiveRenderList.

Next, the execution proceeds to a step L-1310 where the head of OutputEdgeList is read into the variable nextEdge and removed from the list. Next, in a step L-1315, the variable RenderEdge is set to point to the head of ActiveRenderList. Next, a decision block L-1320 determines if nextEdge came to the present tile by emerging from the left tile boundary at the current scanline CurY. Such an edge can be either a marker edge, or an edge whose first offset is −1. If so, it is handled by a step L-1325 which will be described later with reference to FIG. 13B.

If the decision block L-1320 determines that there is no edge emerging from the left tile boundary at the current scanline, control moves to a decision block L-1330, where it is determined if RenderEdge, being the first edge in the ActiveRenderList at this point, extends to the left tile boundary. This can happen only if the next position in RenderEdge's offset table points to the value −1. If so, the control moves to a step L-1335 where the event of an edge going to the left tile boundary 702 at the current scanline is handled. The step L-1335 will be described later with reference to FIG. 13B.

After either the step L-1325 or the step L-1335 have been executed, the control moves to a step L-1340 where all edges in ActiveRenderList are processed and pixels generated in the scanline CurY within the current tile. It can be noted that at given scanline only one edge can be extending from the left tile boundary and only the first edge in ActiveRenderList can be extending to the left tile boundary. That is the reason that the step L-1340 can process the rest of the edges in ActiveRenderList while disregarding the boundary crossing cases. The step L-1340 will be described later with reference to FIG. 13C.

After all edges in ActiveRenderList have been processed by the step L-1340, control moves to a decision block L-1345, where it is determined if all scanlines within the current tile have been rendered. If not, the current scanline number is incremented in a step L-1346 and execution moves back to the step L-1315. If yes, the process L-1300 of rendering the tile output data concludes.

The step L-1325 of processing the edge emerging from left tile boundary will now be described with reference to FIG. 13B.

Figure 13B:
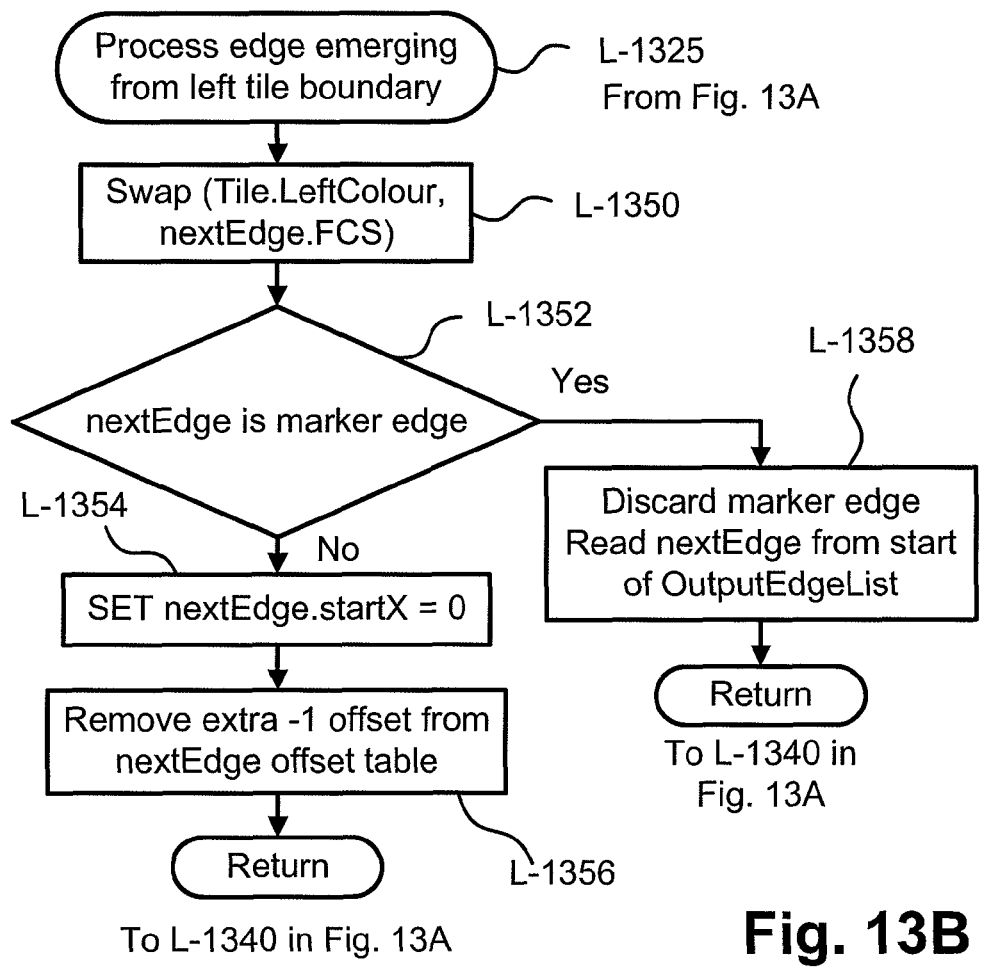

FIG. 13B shows how the step L-1325 starts with swapping the value of the left tile colour of the current tile and the fill compositing sequence on nextEdge in the step L-1350. Next, a decision block L-1352 tests if nextEdge is a marker edge, without any offset table entry, within the current tile. If not, control moves to a step L-1354 where the start X coordinate of nextEdge is set to 0, and a following step L-1356 where the extra offset indicating a nextEdge start position of −1 is removed from its offset table. Then, the execution returns to process L-1300 (ie to the step L-1340 in FIG. 13A). In case block L-1352 determines nextEdge to be a marker edge, the marker edge is discarded and a new edge is read from OutputEdgeList to nextEdge in step L-1358. Then the execution returns to L-1300 (ie to the step L-1340 in FIG. 13A).

The step L-1335 in FIG. 13A for processing the edge going to left tile boundary will now be described with reference to FIG. 13C.

Figure 13C:
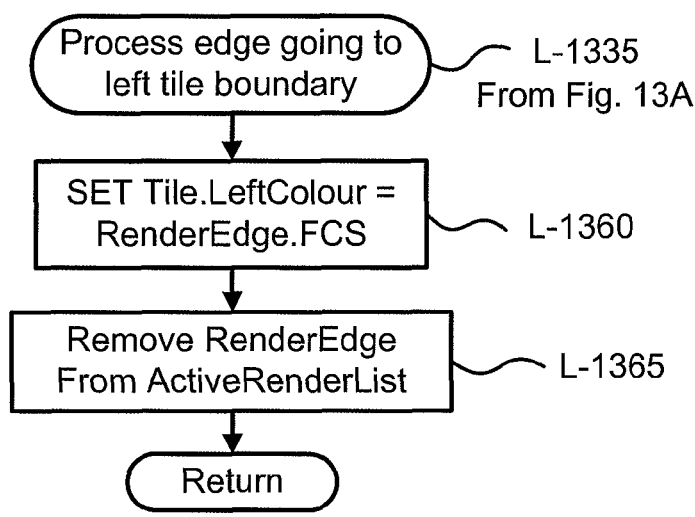

FIG. 13C shows how the step L-1335 starts by changing, in a step L-1360, the left tile colour to the fill compositing sequence referenced by RenderEdge. Next, in a step L-1365, RenderEdge is removed from ActiveRenderList. Then, the execution returns to L-1340 in the process L-1300 in FIG. 13A.

The step L-1340 in FIG. 13A, for processing ActiveRenderList will now be described with reference to FIG. 13D.

Figure 13D:
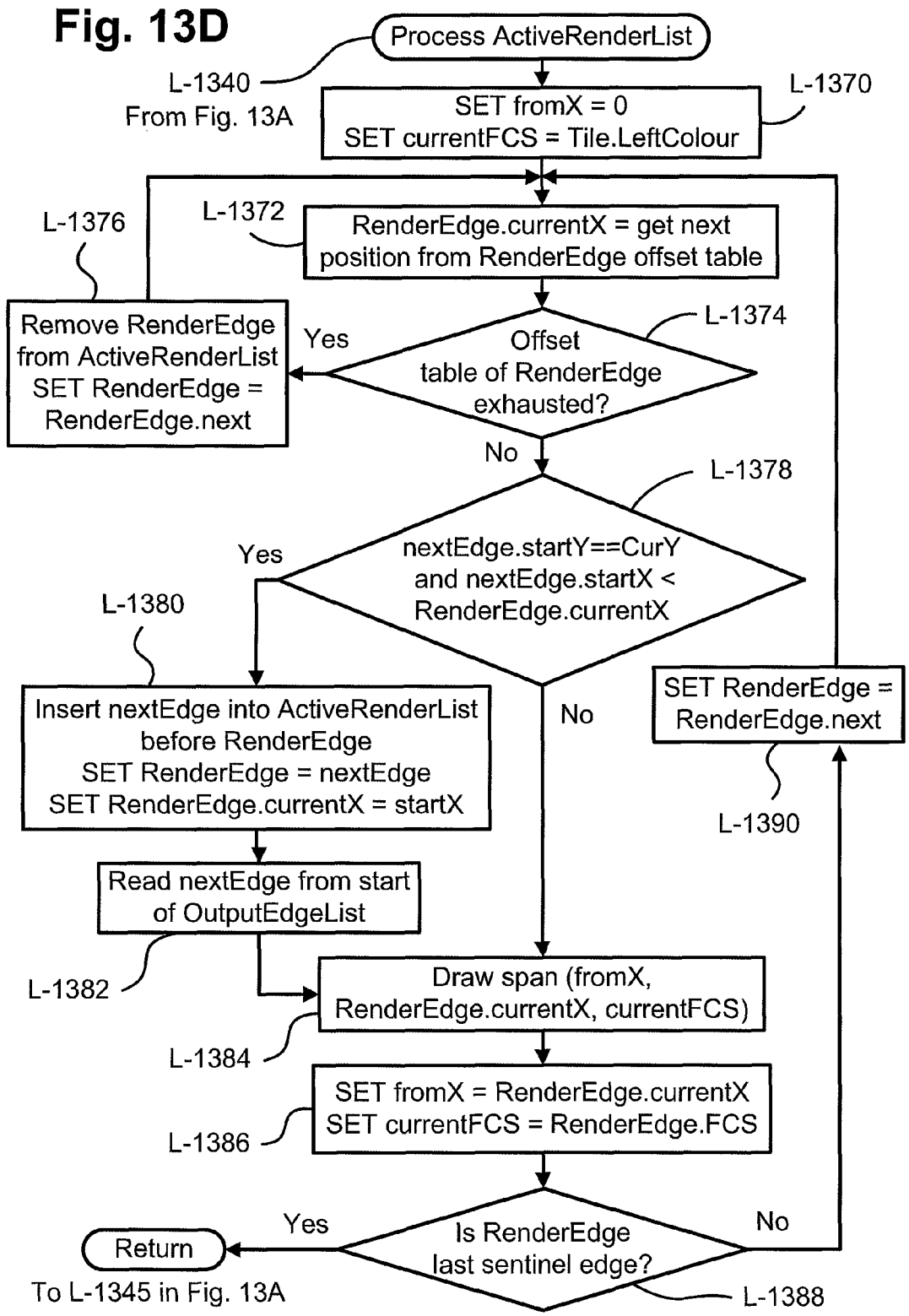

FIG. 13D shows how, firstly, a step L-1370 initializes the X coordinate from which the pixels are to be rendered, in a variable fromX, to the value "0". The step L-1370 also initializes the fill compositing sequence about to be rendered, in a variable currentFCS, to the left tile colour. Then the X coordinate crossing of RenderEdge with the current scanline CurY is determined from RenderEdge's offset table in a step L-1372. Then a decision block L-1374 checks if the variable RenderEdge is terminated at the scanline CurY, this being indicated by exhaustion of its offset table. If so, control moves to a step L-1376 where the edge pointed to by RenderEdge is removed from ActiveRenderList and RenderEdge becomes the next edge in the list. Then control loops back to the step L-1372.

If RenderEdge's offset table is not exhausted, a decision block L-1378 checks if it is time to insert nextEdge into ActiveEdgeList so as to maintain the X coordinate order of the edges in that list. If nextEdge is NULL which occurs when OutputEdgeList has been exhausted, the decision block L-1378 returns a negative value. If L-1378 returns a positive value, execution moves to a step L-1380 where nextEdge is inserted into ActiveRenderList before RenderEdge, the pointer to RenderEdge being set to a newly inserted nextEdge, and the current X coordinate of the newly inserted nextEdge on the current scanline CurY is set to the edge's starting X coordinate. Then a new edge is read from OutputEdgeList to nextEdge in a step L-1382. The steps L-1380 and L-1382 are omitted if the step L-1378 returns a negative value.

Then, the span of pixels from and including from X coordinate up to and excluding RenderEdge's current X coordinate is drawn (ie rendered) using the fill compositing sequence currentFCS, in a step L-1384. Then, in a step L-1386, the coordinate X from where the pixels are to be rendered in variable fromX is updated to the current X coordinate of RenderEdge at current scanline CurY, and the currentFCS is updated to be the fill compositing sequence referenced by RenderEdge. A following decision block L-1388 determines if RenderEdge is the last edge in the ActiveRenderList, which is the case when it is the SentinelEdge from the step L-1305 in FIG. 13A. If so, the rendering of the scanline CurY in the tile has concluded and the control returns to the step L-1345 in the process L-1300 in FIG. 13A for rendering more scanlines as necessary. If negative, control moves to step L-1390 where RenderEdge becomes the next edge in the list. Then control loops back to step L-1372.

Figure 15:
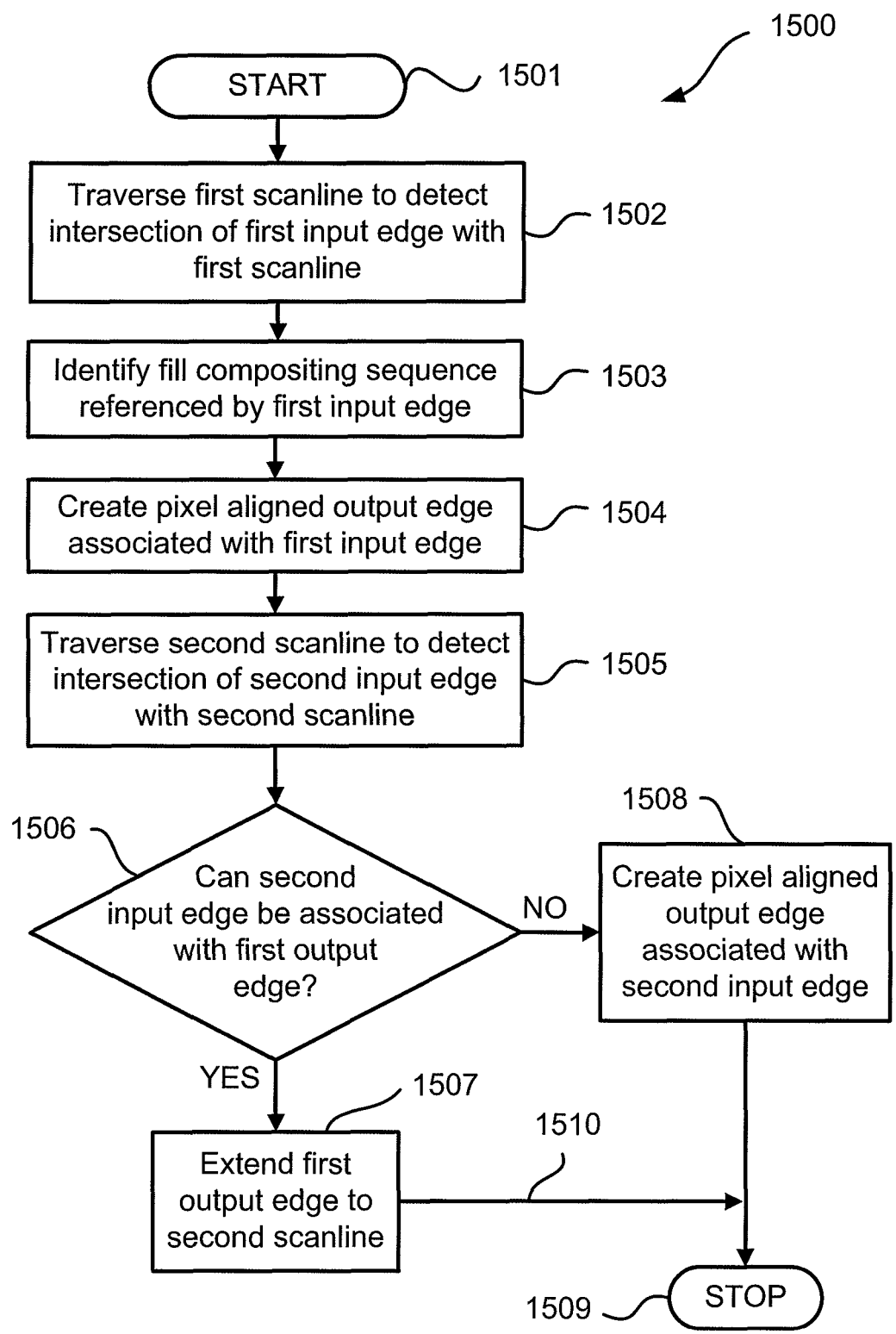
FIG. 15 is a high level flow diagram depicting one example of the SBEC approach.

FIG. 15 is a high level flow diagram depicting one example of the SBEC process, effected by the controller 170 running the program 140. The process 1500 commences with a start step 1501 which receives the document to be rendered according to the SBEC method, this document having been produced, for example, by a software application such as a word processor running on the personal computer 110, after which the processor 170 directed by the controlling program 140 traverses in a step 1502 a first scanline to detect the intersection of a first active vector input edge with the first scanline. A next step 1503 identifies a fill compositing sequence referenced by the detected first input edge, and a following step 1504 creates, at a pixel boundary in the vicinity of the intersection of the first input edge with the first scanline, a first pixel aligned output edge associated with the first input edge. This association ascribes the fill compositing sequence referenced by the first input edge to the first output edge. A following step 1505 traverses a second scanline to detect the intersection of a second active vector input edge with the second scanline, after which a decision step 1506 determines whether the detected second input edge can be associated with the first output edge on the first scanline. If the step 1506 returns a logical TRUE, then a step 1507 extends the first output edge from the first scanline to a pixel boundary in the vicinity of the intersection of the second input edge with the second scanline. The process 1500 is then directed by an arrow 1510 to a STOP step 1509. Returning to the step 1506, if the step returns a logical FALSE, then the process 1500 follows a NO arrow to a step 1508 which creates a pixel aligned output edge associated with the second input edge. The pixel aligned output edge can then be printed on a document 103 by the printer engine 195, or presented on the display 101. The process 1500 is then directed to the STOP step 1509.

INDUSTRIAL APPLICABILITY

It is apparent from the above that the arrangements described are applicable to the computer image processing industry.

The foregoing describes only some embodiments of the present invention, and modifications and/or changes can be made thereto without departing from the scope and spirit of the invention, the embodiments being illustrative and not restrictive.

The claims defining the invention are as follows:

1. A computer implemented method of scan converting a vector input edge of a graphic object into a corresponding pixel-aligned non-overlapping output edge on a rendering device, said method comprising the steps of:
   (a) generating a first output edge on a first scanline based on the vector input edge of the graphic object, the first output edge being a pixel-aligned non-overlapping edge;
   (b) traversing a subsequent scanline to detect the vector input edge of the graphic object on the subsequent scanline;
   (c) determining whether the vector input edge of the graphic object crosses another vector input edge of another object on the subsequent scanline, wherein the vector input edge and the other vector input edge reference the same fill compositing sequence;
   (d) if the vector input edge of the graphic object does not cross the other vector input edge on the subsequent scanline, extending the first output edge to a pixel-aligned position of a second output edge generated based on the vector input edge of the graphic object on the subsequent scanline;
   (e) if the vector input edge of the graphic object crosses another vector input edge on the subsequent scanline, extending the first output edge to a pixel-aligned position of a third output edge generated based on the other vector input edge on the subsequent scanline; and
   (f) storing a fill compositing sequence corresponding to the extended output edge, wherein the extended output edge comprises a reference field referring to an index of the fill compositing sequence so as to associate the pixel-aligned position of the second output edge or the third output edge with the same fill compositing sequence associated with the first output edge.

2. The method according to claim 1, wherein the step of traversing is preceded by the steps of:
    sorting a plurality of vector input edges according to their crossing positions on the current scanline; and
    updating a fill compositing sequence referenced by each of the plurality of vector input edges.

3. The method according to claim 1, further comprising the step of terminating said first output edge if the vector input edge does not follow the second output edge on the subsequent scanline.

4. The method according to claim 3, further comprising the step of creating a new output edge corresponding to the vector input edge.

5. The method according to claim 4, wherein the first output edge can be extended if the new output edge refers to the same fill compositing sequence.

6. The method according to claim 1, comprising a further step of using the extended pixel-aligned non-overlapping output edge to render at least one pixel of the graphical object.

7. The method according to claim 1, comprising a further step of associating the extended pixel-aligned non-overlapping output edge to the fill compositing sequence of the vector input edge.

8. A computer implemented method of scan converting an image including at least one graphic object comprising a set of vector input edges, to a set of corresponding pixel-aligned non-overlapping output edges, said method comprising the steps of:
    (a) traversing a first scanline to detect an intersection of a first active vector input edge of the graphic object with the first scanline;
    (b) identifying a fill compositing sequence referenced by the detected first active vector input edge of the graphic object;
    (c) creating, at a pixel boundary of the intersection of the first active vector input edge of the graphic object with the first scanline, a first pixel aligned non-overlapping output edge that is based on the first active vector input edge of the graphic object;
    (d) traversing a second scanline to detect the intersection of a second active vector input edge of the graphic object with said second scanline, wherein the first active vector input edge and the second active vector input edge reference the same fill compositing sequence;
    (e) determining whether the second active vector input edge of the graphic object crosses another active vector input edge of another object on the second scanline, wherein the second active vector input edge and the other active vector input edge reference the same fill compositing sequence;
    (f) determining, if the second active vector input edge of the graphic object does not cross another active vector input edge on the second scanline, whether the detected second active vector input edge of the graphic object can be associated with the first pixel-aligned non-overlapping output edge on the first scanline;
    (g) generating, if the determining step (f) is true, a second output edge on the second scanline based on the second active vector input edge of the graphic object;
    (h) generating, if the determining step (f) is not true, the second output edge on the second scanline based on the other active vector input edge of the graphic object;
    (i) extending the first pixel-aligned non-overlapping output edge from the first scanline to a pixel boundary of the second output edge; and
    (j) storing a fill compositing sequence corresponding to the extended output edge, wherein the extended output edge comprises a reference field referring to an index of the fill compositing sequence so as to associate the pixel-aligned position of the second output edge with the same fill compositing sequence associated with the first output edge.

9. A method according to claim 8, wherein the pixel boundaries in the steps (c) and (h) comprise pixels contiguous to the respective intersections.

10. A method according to claim 9, wherein the pixel boundaries in the steps (c) and (h) are determined using pixel placement rules associated with said image.

11. A method according to claim 9, wherein the step (f) comprises the steps of:
    (a) determining if the second active vector input edge references the same fill compositing sequence as is referenced by the first active vector input edge; and
    (b) determining if the second active vector input edge is within a predetermined maximum distance from the first output edge.

12. A method according to claim 11, wherein if at least one of the steps (a) and (b) is not true, then the method comprises the further step of creating, at a pixel boundary in the vicinity of said intersection of the second active vector input edge with said second scanline, a second pixel aligned output edge associated with the second active vector input edge, wherein said association ascribes the fill compositing sequence referenced by said second active vector input edge to the second output edge.

13. An apparatus for scan converting an image including at least one graphic object comprising a set of vector input edges, to a set of corresponding pixel-aligned non-overlapping output edges, said apparatus comprising:
    a memory for storing a program; and
    a processor for executing the program, said program comprising:
    (a) code for traversing a first scanline to detect an intersection of a first active vector input edge of the graphic object with the first scanline;
    (b) code for identifying a fill compositing sequence referenced by the detected first active vector input edge of the graphic object;
    (c) code for creating, at a pixel boundary in the vicinity of said intersection of the first active vector input edge of the graphic object with said first scanline, a first pixel aligned non-overlapping output edge that is based on the first active vector input edge of the graphic object;
    (d) code for traversing a second scanline to detect the intersection of a second active vector input edge of the graphic object with said second scanline, wherein the first active vector input edge and the second active vector input edge reference the same fill compositing sequence;
    (e) code for determining whether the second active vector input edge of the graphic object crosses another active vector input edge of another object on the second scanline, wherein the second active vector input edge and the other active vector input edge reference the same fill compositing sequence;
    (f) code for determining, if the second active vector input edge of the graphic object does not cross another active vector input edge on the second scanline, whether the detected second active vector input edge of the graphic object can be associated with the first pixel-aligned non-overlapping output edge on the first scanline;

(g) code for generating, if the determining step (f) is true, a second output edge on the second scanline based on the second active vector input edge of the graphic object;

(h) code for generating, if the determining step (f) is not true, the second output edge on the second scanline based on the other active vector input edge of the graphic object;

(i) code for extending the first pixel-aligned non-overlapping output edge from the first scanline to a pixel boundary of the second output edge; and (j) code for storing a fill compositing sequence corresponding to the extended output edge, wherein the extended output edge comprises a reference field referring to an index of the fill compositing sequence so as to associate the pixel-aligned position of the second output edge with the same fill compositing sequence associated with the first output edge.

14. An apparatus for scan converting an image including at least one graphic object comprising a set of vector input edges, to a set of corresponding pixel-aligned non-overlapping output edges, said apparatus comprising:

(a) means for traversing a first scanline to detect an intersection of a first active vector input edge of the graphic object with the first scanline;

(b) means for identifying a fill compositing sequence referenced by the detected first active vector input edge of the graphic object;

(c) means for creating, at a pixel boundary in the vicinity of said intersection of the first active vector input edge of the graphic object with said first scanline, a first pixel aligned non-overlapping output edge that is based on the first active vector input edge of the graphic object;

(d) means for traversing a second scanline to detect the intersection of a second active vector input edge of the graphic object with said second scanline, wherein the first active vector input edge and the second active vector input edge reference the same fill compositing sequence;

(e) means for determining whether the second active vector input edge of the graphic object crosses another active vector input edge of another object on the second scanline, wherein the second active vector input edge and the other active vector input edge reference the same fill compositing sequence;

(f) means for determining, if the second active vector input edge of the graphic object does not cross another active vector input edge on the second scanline, whether the detected second active vector input edge of the graphic object can be associated with the first pixel-aligned overlapping output edge on the first scanline;

(g) means for generating, if the determining step (f) is true, a second output edge on the second scanline based on the second active vector input edge of the graphic object;

(h) means for generating, if the determining step (f) is not true, the second output edge on the second scanline based on the other active vector input edge of the graphic object;

(i) means for extending the first pixel-aligned non-overlapping output edge from the first scanline to a pixel boundary of the second output edge; and (j) means for storing a fill compositing sequence corresponding to the extended output edge, wherein the extended output edge comprises a reference field referring to an index of the fill compositing sequence so as to associate the pixel-aligned position of the second output edge with the same fill compositing sequence associated with the first output edge.

15. A computer readable non-transitory storage medium having recorded thereon instructions that when executed by a processor, perform a method for scan converting an image including at least one graphic object comprising a set of vector input edges to a set of corresponding pixel-aligned non-overlapping output edges on a rendering device, wherein said instructions, when executed by a processor, further perform said method comprising steps of:

(a) traversing a first scanline to detect the intersection of a first active vector input edge of the graphic object with the first scanline;

(b) identifying a fill compositing sequence referenced by the detected first active vector input edge of the graphic object;

(c) creating, at a pixel boundary in the vicinity of the intersection of the first active vector input edge of the graphic object with said first scanline, a first pixel aligned non-overlapping output edge that is based on the first active vector input edge of the graphic object;

(d) traversing a second scanline to detect the intersection of a second active vector input edge of the graphic object with said second scanline, wherein the first active vector input edge and the second active vector input edge reference the same fill compositing sequence;

(e) determining whether the second active vector input edge of the graphic object crosses another active vector input edge of another object on the second scanline, wherein the second active vector input edge and the other active vector input edge reference the same fill compo siting sequence;

(f) determining, if the second active vector input edge of the graphic object does not cross another active vector input edge on the second scanline, whether the detected second active vector input edge of the graphic object can be associated with the first pixel-aligned non overlapping output edge on the first scanline;

(g) generating, if the determining step (f) is true, a second output edge on the second scanline based on the second active vector input edge of the graphic object;

(h) generating, if the determining step (f) is not true, the second output edge on the second scanline based on the other active vector input edge of the graphic object;

(i) extending, the first pixel-aligned non-overlapping output edge from the first scanline to a pixel boundary of the second output edge; and (j) storing a fill compositing sequence corresponding to the extended output edge, wherein the extended output edge comprises a reference field referring to an index of the fill compositing sequence so as to associate the pixel-aligned position of the second output edge with the same fill compositing sequence associated with the first output edge.

* * * * *